United States Patent
De Magalhaes

(10) Patent No.: US 9,912,907 B2
(45) Date of Patent: Mar. 6, 2018

(54) DYNAMIC VIDEO AND SOUND ADJUSTMENT IN A VIDEO CONFERENCE

(71) Applicant: INTERNATIONAL BUSINESS MACHINES CORPORATION, Armonk, NY (US)

(72) Inventor: Arthur L. De Magalhaes, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/963,854

(22) Filed: Dec. 9, 2015

(65) Prior Publication Data
US 2016/0173821 A1    Jun. 16, 2016

(30) Foreign Application Priority Data
Dec. 15, 2014 (CA) ..................... 2874715

(51) Int. Cl.
*H04N 7/15* (2006.01)
*G06K 9/00* (2006.01)
(Continued)

(52) U.S. Cl.
CPC ........... *H04N 7/15* (2013.01); *G06K 9/00718* (2013.01); *H04N 5/23206* (2013.01);
(Continued)

(58) Field of Classification Search
CPC ........ H04N 7/15; H04N 5/2628; G06T 7/004; G06K 9/00718; G06K 2209/21; G06K 9/00221; A61B 2034/2065; A61B 5/1176; G06F 3/013; G06F 17/30793; G05B 2219/33298
(Continued)

(56) References Cited

U.S. PATENT DOCUMENTS 6,795,106 B1    9/2004  Cooper
6,894,714 B2 *  5/2005  Gutta .................. H04N 7/15
                                                348/14.05
(Continued)

OTHER PUBLICATIONS

Wang et al., "Multi-Camera Skype: Enhancing the Quality of Experience of Video Conferencing," Aug. 2012, The Era of Interactive Media, pp. 1-7.
(Continued)

*Primary Examiner* — Stella Woo
(74) *Attorney, Agent, or Firm* — David Zwick; Matthew M. Hulihan; Heslin Rothenberg Farley & Mesiti PC

(57) ABSTRACT

Dynamic focus and adjustment on one or more participants of a video conference. One or more key participants of the video conference are designated. The key participant or participants are then identified at their corresponding site from video images obtained from their site. A determination is made that another participant at the site is a focus target of the video conference. The video images obtained from the site are modified to include both the other participant and the key participant while the other participant is the focus target. Thus, focus is maintained at least on the key participant at the site, even when the focus target is a participant other than the key participant.

20 Claims, 16 Drawing Sheets

(51) Int. Cl.
*H04N 5/262* (2006.01)
*H04N 5/232* (2006.01)

(52) U.S. Cl.
CPC ..... *H04N 5/23212* (2013.01); *H04N 5/23219* (2013.01); *H04N 5/2628* (2013.01)

(58) Field of Classification Search
USPC .................... 348/14.08, 14.09; 382/103, 118
See application file for complete search history.

(56) References Cited

U.S. PATENT DOCUMENTS

| | | | |
|---|---|---|---|
| 7,969,472 B2 | 6/2011 | Biegelsen et al. | |
| 8,169,463 B2 | 5/2012 | Enstad et al. | |
| 8,289,363 B2 | 10/2012 | Buckler | |
| 8,896,657 B2 * | 11/2014 | Wang | H04N 7/142 348/14.07 |
| 2007/0120971 A1 * | 5/2007 | Kennedy | H04N 7/142 348/14.16 |
| 2011/0285808 A1 * | 11/2011 | Feng | H04N 7/142 348/14.09 |
| 2011/0285809 A1 * | 11/2011 | Feng | G06K 9/00234 348/14.16 |
| 2012/0293606 A1 * | 11/2012 | Watson | H04N 5/232 348/14.16 |
| 2012/0314015 A1 * | 12/2012 | Watson | H04N 7/15 348/14.1 |
| 2012/0320141 A1 | 12/2012 | Bowen et al. | |
| 2012/0327179 A1 * | 12/2012 | Watson | H04N 5/247 348/14.08 |
| 2014/0340467 A1 * | 11/2014 | Kajarekar | G06K 9/00288 348/14.08 |
| 2015/0049162 A1 * | 2/2015 | Kurupacheril | H04N 5/23238 348/14.08 |
| 2016/0134838 A1 * | 5/2016 | Tangeland | H04N 7/152 348/14.09 |

OTHER PUBLICATIONS

Wang et al., "Robust Automatic Video-Conferencing with Multiple Cameras and Microphones," IEEE International Conference on Multimedia and Expo, 2000 (no further date information available), Abstract (pp. 1-2).

Cisco, "Cisco TelePresence SpeakerTrack 60 Camera," Data Sheet, 2013 (no further data information available), pp. 1-3.

* cited by examiner

DYNAMIC VIDEO AND SOUND ADJUSTMENT IN A VIDEO CONFERENCE

PRIOR FOREIGN APPLICATION

This application claims priority from Canadian patent application number 2874715, filed Dec. 15, 2014, which is hereby incorporated herein by reference in its entirety.

BACKGROUND

One or more aspects of the present application relate generally to videotelephony and more specifically to techniques for managing dynamic focus during video conferencing.

The use of videotelephony has become increasing widespread, particularly in view of its deployment on a variety of platforms including smartphones, tablets, and laptop computers, and increased reliance on video conferencing solutions in place of face-to-face meetings requiring travel.

The user experience during a video conference depends on sufficient information being transmitted between sites of the video conference. A basic requirement, generally, is that the video and audio of a current speaker at a given video conference site be captured and transmitted to other participants, preferably at as high a quality (for example, in terms of resolution and/or frames per second) as the transmission medium will support. Some video conferencing solutions therefore provide for camera or focus switching, so that the camera focus at a given site switches between different participants as they take turns speaking. At the same time, however, user experience can be enhanced by also transmitting sufficient video and/or audio data so that users can appreciate contextual cues from remote participants while another participant is speaking.

SUMMARY

Shortcomings of the prior art are overcome and additional advantages are provided through the provision of a method of providing dynamic focus on one or more participants during a video conference at a plurality of sites. The method includes receiving a designation of a key participant of the video conference; identifying the key participant at a first site of the plurality of sites of the video conference, the first site comprising a plurality of participants including at least a first participant and the key participant; obtaining video images for the first site, the video images comprising at least the key participant; determining that the first participant is a focus target of the video conference; and modifying the video images for the first site to comprise both the first participant and the key participant based on the first participant being the focus target.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

In drawings which illustrate by way of example only embodiments of the present disclosure, in which like reference numerals represent like parts.

DETAILED DESCRIPTION

The embodiments and examples described below accordingly provide a method, system, and machine-readable medium presenting improvements in dynamic focus adjustment during a video conference. In particular, a solution is provided in which focus of the video and/or audio feed at a given video conference site is adjusted dynamically based not only on the detection of a current speaker or presenter, but also based on the position of a key participant at the site.

Figure 1:
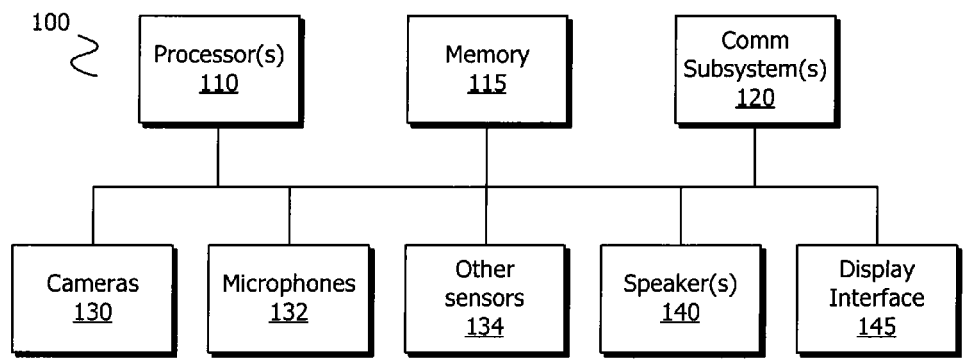
FIG. 1 is a block diagram illustrating select components of a video conferencing system for use at a video conferencing site.
Figure 2:
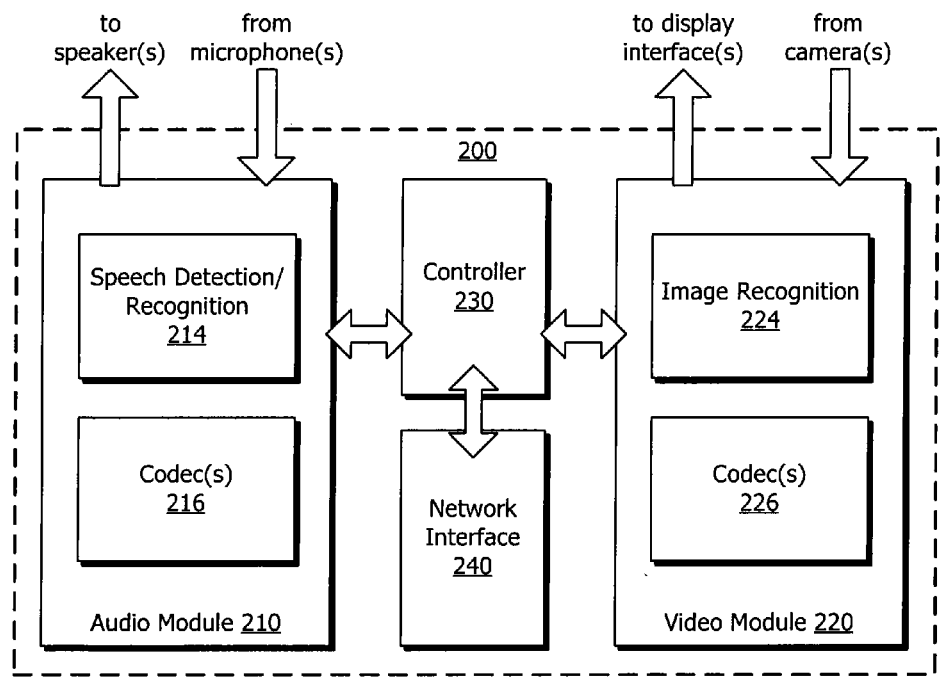
FIG. 2 is a block diagram illustrating further select components of a video conferencing system.
Figure 3:
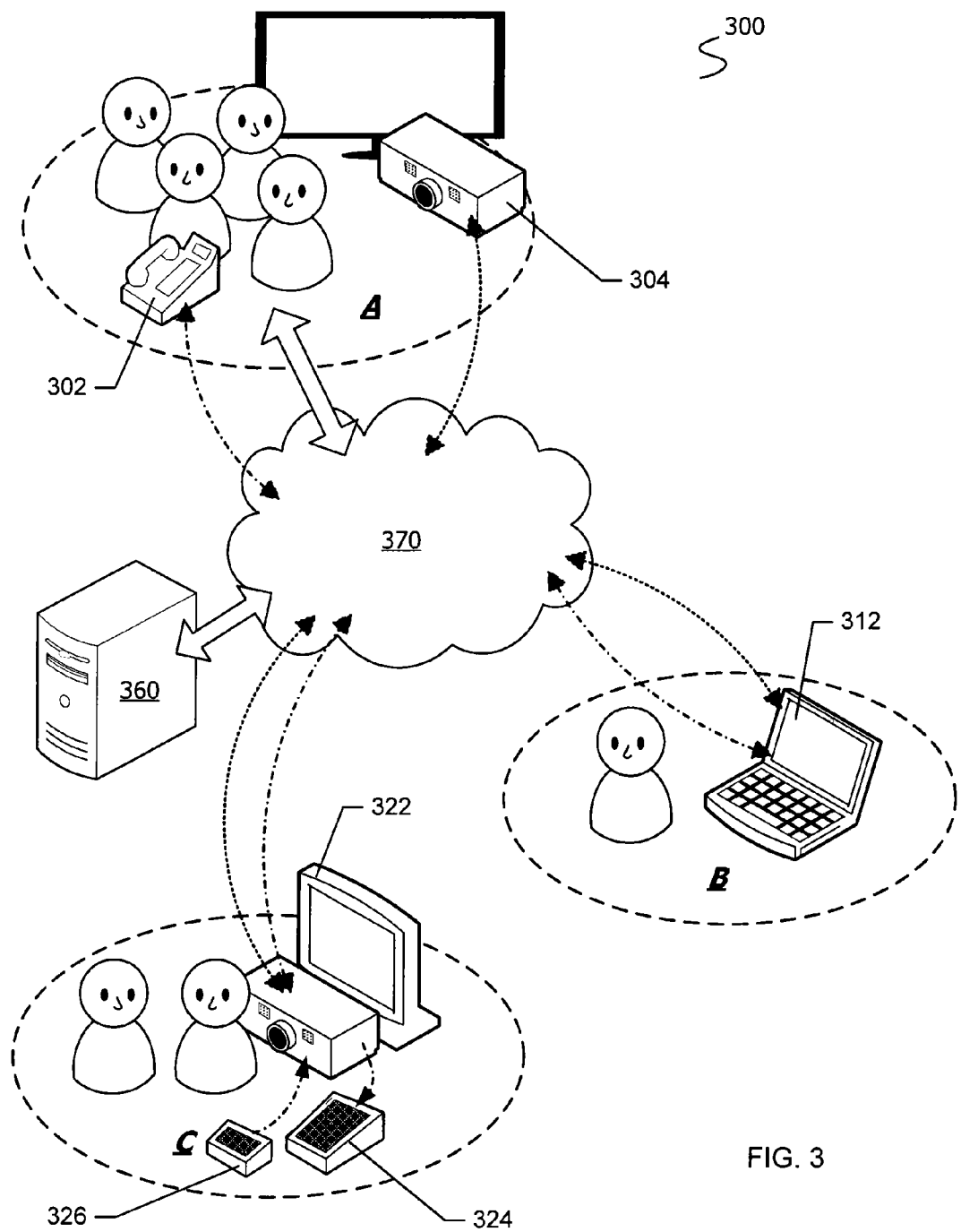
FIG. 3 is an example topology of a video conference between multiple sites over a network.
Figure 4:
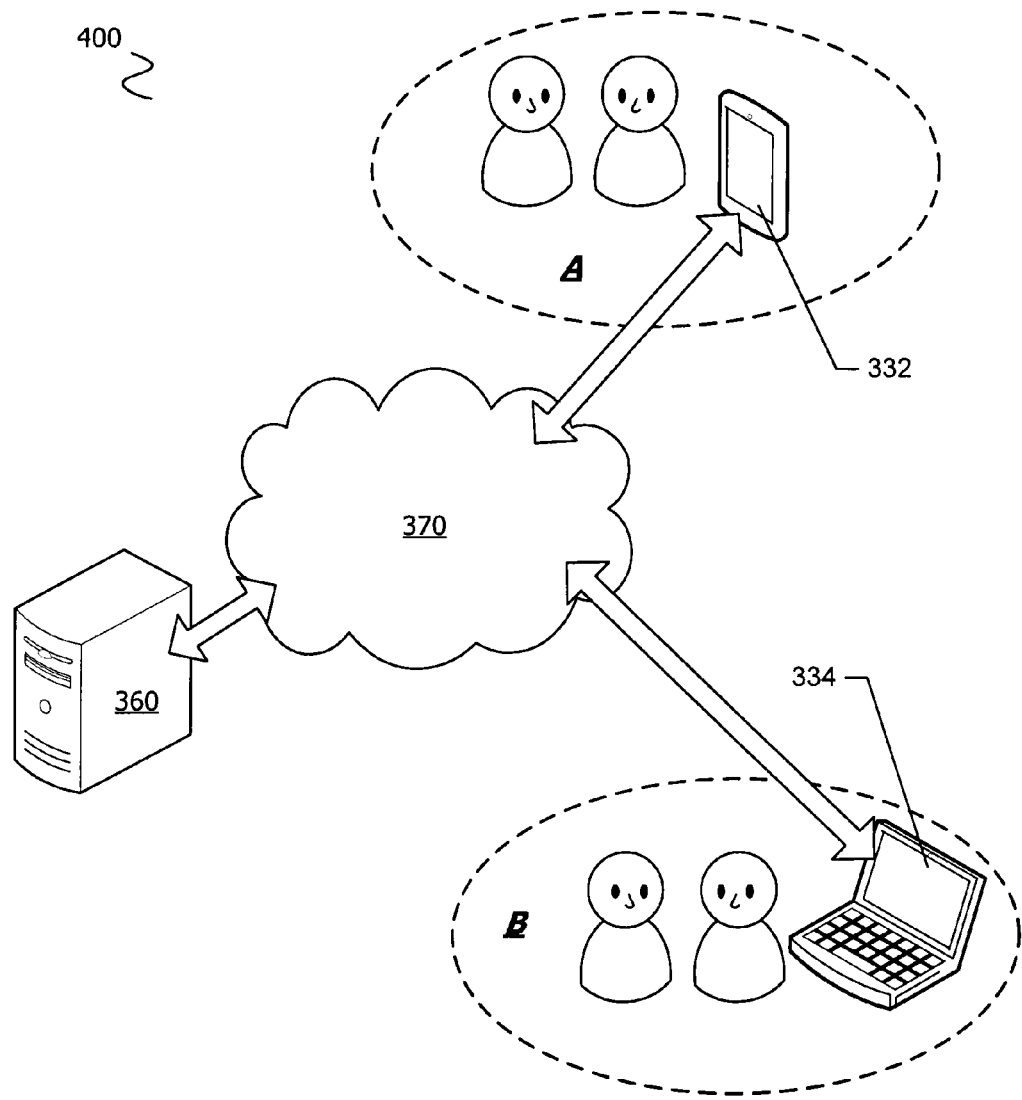
FIG. 4 is a further example topology of a video conference between multiple sites over a network.

The embodiments and examples herein are described and illustrated primarily in the context of a video conferencing system or unit. FIGS. 1 and 2 are block diagrams illustrating select components of an example video conferencing system. It will be understood by those skilled in the art that the components illustrated in the accompanying drawings are merely representative of particular aspects of a video conferencing system, and that other components typically included in such systems have been excluded only for brevity. The systems depicted here may be successfully used with the various embodiments and examples described herein, even if some components described in relation to FIG. 1 or 2 are omitted or substituted. Thus, the example systems of FIGS. 1 and 2, and the example environments or topologies described in connection with FIGS. 3 and 4, are not intended to be limiting.

FIG. 1 illustrates select components of a video conferencing system 100. The system 100 has at least one processor 110, which can include a main processor, and optionally distinct graphics processing units (GPUs) and/or audio processors. One or more memory devices 115 are included for storing video and/or audio data as well as configuration data, such as the key participant designation discussed below, on a temporary or more permanent basis. These components are operably connected to input devices such as cameras 130, microphones 132, and other optional sensors 134 (e.g., proximity or motion sensors), as well as to different output devices such as speakers 140, and display screens or panels via a display interface 145. The input devices and output devices may be integrated into the unit containing the processor(s) 110 and memory 115, or may be provided as external peripheral equipment. The input and output devices may be sourced separately, e.g., from different manufacturers and suppliers.

The system 100 includes one or more communication subsystems 120 that are configured for wired or wireless network or direct communication with other devices and systems, including video conferencing host systems and/or other video conferencing systems 100. If the input devices and/or output devices are provided as standalone equipment from the unit including the processor(s) 110, memory 115, and communication subsystem(s) 120, then the communication subsystem(s) 120 may be configured to communicate with the input and/or output devices as well. For instance, the communication subsystem(s) 120 can include a Bluetooth™ or Wi-Fi™ communication subsystem for data communications with input and output devices.

FIG. 2 illustrates select components of a video conferencing system 200 in terms of functional modules, which may be implemented by hardware, software, or a combination thereof. A controller module 230 (which may be implemented by the processor(s) 110 of FIG. 1, together with appropriate firmware or software and an operating system, not illustrated) controls overall operation and configuration of the video conferencing system 200. The controller module 230 is in operable communication with a network interface module 240, which provides interface functionality over one or more networks (wired or wireless) and possibly connectivity with other communication media. The controller module 230 is also in communication with an audio module 210 and a video module 220, which receive and process audio and video data, respectively.

The audio module 210 can include, among other modules or components for processing audio data, speech detection and recognition modules 214 and codecs 216 for processing incoming or outgoing video data. A speech detection module can be configured to detect instances of speech at a site (for example, to trigger recording or other functions of the video conferencing system 200), and/or determine the relative physical location of the detected speech for use in controlling the operation of individual microphones at the site. Speech recognition may be used to distinguish between individual voices for the purpose of filtering out other voices (using a filtering module, not shown).

The video module 220 can include image recognition modules 224 for use in detecting speech or distinguishing between conference participants, and appropriate codecs 226 for use in processing incoming or outgoing video data. The image recognition modules 224 can include face tracking or pattern recognition algorithms. The audio and video modules 210, 220 also include, respectively, interfaces (not illustrated) for data communication between input units such as microphones and cameras, and output units such as speakers and display screens. The selection and implementation of appropriate speech and video modules, including codecs 216 and 226 and speech detection/recognition modules 214, image recognition modules 224, including appropriate encoding, decoding, and compression algorithms, will be understood by those skilled in the art. Video conferencing systems 100, 200 can also be equipped with security modules providing end-to-end security with other video conferencing systems and intermediate host systems.

The components of the video conferencing system 100 or 200 may be contained in a standalone, special-purpose video conferencing unit. Frequently the camera(s) and microphone(s) are provided as separate peripheral devices so that they can be advantageously placed in the conference room or site. Display screens, not illustrated in FIG. 1 or 2, and speakers 140 are also frequently provided as separate devices. In other cases, however, the video conferencing system 100 or 200 may be built into a more general-purpose or less specialized data processing device, such as a personal computer, laptop computer, tablet, or smartphone; these types of devices are often provisioned with integrated cameras, microphones, speakers, and display screens. Thus, the examples and embodiments described herein can be implemented on suitably provisioned video and audio conferencing equipment, cellular phones, smartphones, desktop computers, terminals, netbooks, laptops, tablets, handheld wireless communication devices, notebook computers, portable gaming devices, tabletop displays, Internet-connected televisions, set-top boxes, in-vehicle entertainment or communication systems, and the like.

Further, those skilled in the art will understand that while the components of a video conferencing system 100 or 200 may be implemented at each video conferencing site, it is also possible for these components to be distributed across multiple sites or locations. For instance, input devices (cameras and microphones) capture input video and audio data at a local site, and the local video conferencing equipment pre-processes and encodes the data for transmission to a host data processing system. However, the host data processing system executes any speech detection/recognition modules and image recognition modules, and further filters or processes the audio and video data in accordance with the examples and embodiments discussed below. Such a distributed system can minimize the resources required at each conference site by allocating the more processor- and memory-intensive processing to a central system.

FIGS. 3 and 4 illustrate example arrangements or topologies for video conferences using equipment such as that described in FIGS. 1 and 2. In FIG. 3, a first arrangement 300 is shown between three sites A, B, and C. It will of course be appreciated by those skilled in the art that the arrangements described here, and the examples and embodiments described below, need not be limited to the number of sites depicted herein.

In the example of FIG. 3, each site A, B, and C is provisioned with video conferencing-enabled equipment, which need not be identical. Site A, for instance, is provisioned with a video system 304 that receives and transmits video data between site A and a network 370. The audio feed from and to site A is provided by a telephone 302 equipped with a speaker and microphone. The telephone 302 and the video system 304 in this case may be capable of operating independently; thus, for example, the controller in the video system 304 controls only video modules, and not any audio modules. Site B is provisioned with a laptop computer 312, which is equipped with an integrated display screen, camera, speaker, and microphone. The computer 312 receives and transmits audio and video data between the computer 312 and the network 370 using a built-in network adapter. The laptop computer's main processor may operate as the controller for the audio and video modules used to provide video conferencing functionality. Site C is provisioned with another video conferencing system 322 that controls both video and audio operation, with peripheral audio components (microphone and speaker) 326 and 324.

Each of the systems 304, 312, 322 transmits and receives data to and from a host video conferencing server system 360 over the network 370. The network 370 in these examples may be a local area network (fixed or wireless), a wide area network, a private network, or the Internet. The host system 360 manages communications between multiple sites, receiving audio and video feeds from each site, and addressing and transmitting the feeds to the other sites. The host system 360 may also carry out other functions, such as billing, authentication, etc., for a number of users and sites. In this case, the audio and video feeds are to be passed through the host system 360 more or less in the form in which they were received by the host system 360, and therefore focusing, recognition, filtering, and other processing is carried out by the video conferencing equipment at each site A, B, and C prior to transmission of their respective audio and/or video feeds to the host system.

FIG. 4 illustrates another arrangement 400 of video conference systems at two sites A and B. Here, the participants at each site are equipped with a personal communication or data processing device that is also provisioned with a video conference system 200. One site employs a tablet or smartphone 332 including an integrated speaker, microphone, display screen, and camera, while the other site employs a laptop or personal computer 334, equipped in a manner similar to the laptop computer 312 in FIG. 3. Audio and video data received by the microphone and camera of each device is transmitted over the network 370 to a host video conferencing system 360. While each personal device 332, 334 may have the processing and memory resources required to carry out audio or image recognition, in this example, filtering, focusing, and other data processing performed on the audio and video data is carried out by the host system 360 so as to minimize processor time and power consumption of the personal devise 332, 334. Thus, the devices 332, 334 may only pre-process and compress the data for transmission to the host system 360. It can be seen by these two examples that the host system 360 does not always merely pass through the video and audio streams as received from the source video conferencing site.

FIGS. 3 and 4 illustrate only three and two remote video conferencing sites, respectively, with a host system 360 located remotely from the video conferencing sites. However, it will be understood by those skilled in the art that there may be more than three video conferencing sites, and that the host system 360 may be resident at one of the video conferencing sites, optionally integrated with a video conferencing system 100, 200. Further, the concepts described herein can also apply to a broadcast or webcast, which may not be considered to be a traditionally interactive "video conference" between two participating parties. In addition, it should be appreciated that while the term "remote" is used here to distinguish between sites, "remoteness" does not mean a geographic remoteness or separation unless explicitly defined as such. "Remoteness" may refer only to a logical distinction or an equipment-related distinction between sites. For instance, it is possible that two video conference sites could be located in the same room or building; however, they may be considered "remote" because independently operating video conferencing systems are used to serve those sites.

As mentioned above, some video conferencing solutions provide for focus switching, whereby the focus of either the video or audio feeds, or both, at a given video conference site, is switched between active speaking participants at that site. Focus switching may be implemented by the video conferencing input equipment—for instance, one or more site cameras may be physically focused on the active speaker, and one or more microphones in the vicinity of the active speaker may be turned on or set to receive while other microphones are disabled—or the switch may be implemented during or after processing of the raw video or audio data, for example by cropping video images to exclude non-speakers or filtering out sounds other than the speaker's voice, using known algorithms. Focusing on the current speaker in this manner ensures that the participants at other sites pay attention to the speaker at a remote site, rather than to a non-speaking participant. Further, depending on the equipment and compression algorithms employed, focusing on the current speaker can potentially improve the perceived quality of the video and audio stream received from that site.

However, focus switching in this manner potentially results in abrupt scene changes within the video feed of a given site, when the current speaker switches abruptly from one participant to another at the same site. Further, the actual change in the video feed from one speaker to the next may lag behind the actual switch in speakers at the site, for instance if there is only one camera available and thus no opportunity to switch between different video feeds. In addition, focus switching in this manner may exclude contextual cues or other information from the audio or video feeds that other participants might find useful. For instance, the video conference may include principal or key participants whose reactions to the video conference proceedings are of value to remote participants, even if the key participants are not always actively presenting to the other participants. The key participant may be a manager, visiting official, guest, etc.; however the social or hierarchical relationship of the key participant to the other participants is defined, and whether or not the key participant is hierarchically superior to other participants, the key participants in the embodiments described here are identified during a video conference using received data and pattern matching techniques implemented in the video conferencing system or host system.

The embodiments and examples described herein accordingly provide a solution in which focus of the video and/or audio feed at a given video conference site is adjusted dynamically based not only on the detection of a current speaker or presenter, but also based on the position of a key participant at the site so that focus is maintained at least on the key participant at the site, even when a focus target at that site of the video conference is a participant other than the key participant.

Figure 5:
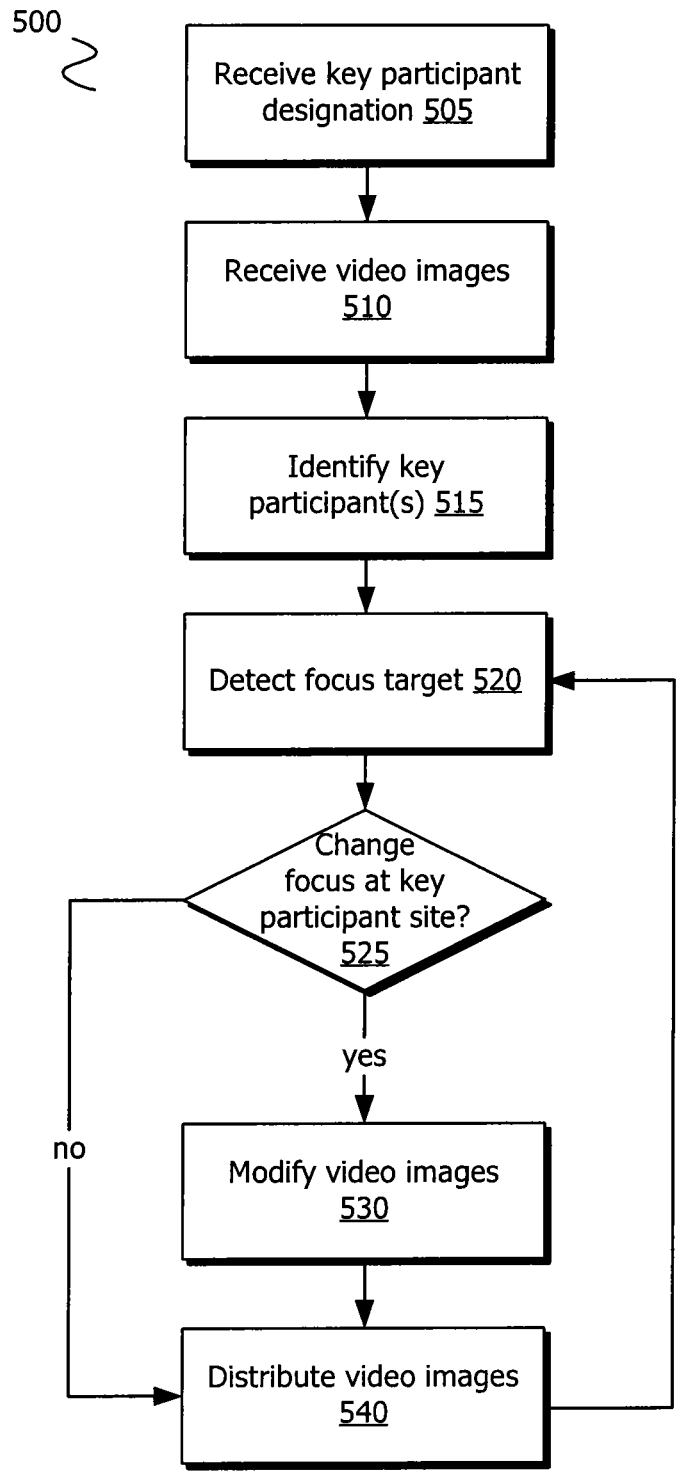
FIG. 5 is a flowchart illustrating a method for dynamically adjusting focus at a video conference site with reference to a key participant.

An overview process 500 representative of these embodiments is shown in the flowchart of FIG. 5. This process may be implemented by the video conferencing system 100, 200 at a site where the key participant is located, or at a location remote from the key participant's site, such as another site of the video conference, or at a host system 360. Generally, the process depicted in 500 is carried out by the system that will carry out any recognition, filtering, and focusing functions on the audio and/or video data. At 505, a key participant designation is received and stored in memory of the system implementing the method. The designation may take different forms; in the examples discussed below, the designation is data comprising an image representation of the key participant. The key participant designation may be determined and received either prior to the commencement of a video conferencing session, or during the session.

At 510, video image data from one or more video conference sites is received. If the system implementing the process 500 is located at the video conference site with the key participant, then the images are received from the camera 130 or similar input device at the site. At 515, the video image data is processed by an image recognition module 224 to determine whether the key participant is present in the image. This processing may comprise an image match or facial recognition, where facial features are extracted from both the key participant designation data and the video image data from the site, and a determination is made whether the features extracted from key participant designation data and the video image data are matched.

The identification of the key participant 515 may be carried out independently at each video conference site by the video conferencing system 100, 200 resident at that location. As noted above, image processing can occur at the host system 360, in which case the host system 360 will carry out the key participant identification on the video images received from each site's video conferencing system 100, 200. If only one key participant is designated, the host system 360 may identify only one key participant from all sites based on the best match between the key participant designation data and the various video images. However, there may be multiple key participants designated and identified in some implementations; generally it is expected that only one key participant will be designated per site, although those skilled in the art will readily understand that the examples and embodiments herein can be adapted to accommodate multiple key participants per site. Examples of key participant designation, which need not involve an identification of the personal identity of the key participant, are discussed below with reference to FIGS. 6, 7A, and 7B.

While the video conference is in session, the system 100, 200 or the host system 360 receives video images from the key participant's site, and processes the image data to detect a focus target 520. A focus target, generally, is a participant who is engaged in presentation (e.g., speaking), and who has a visual focus on a presentation focus location, which is a location associated with presentation to other participants or general attentiveness to the proceedings. An example of a presentation focus location is the display screen or camera of the video conference system 100, 200 of the participant's site; if the participant is looking at the camera and speaking, he or she is deemed to be a focus target since looking at the camera and speaking are generally indicative that the participant is making a presentation to participants at other sites of the video conference. Alternatively, the presentation focus location may be defined as any location other than a location at the video conference site associated with a lack of attention to proceedings; for example, if facial recognition performed on images of a particular participant determine that the participant's focus of attention (as determined by the direction in which the participant is looking) is another participant other than a speaker or a key participant, then the participant's attention is not directed to a presentation focus location.

As suggested above, detection of the focus target can be carried out at least in part by facial recognition; for example, an image received from the camera of the video conferencing system 100, 200 can be processed using facial recognition techniques to both detect the likely focus of attention as determined by the position and direction of each participant's eyes, and whether motion detected in video images representing a participant's face are indicative of speech. If facial recognition techniques detect a participant with a focus of attention directed to a presentation focus location who is determined to be engaged in speech, then this participant is determined to be a focus target. In other implementations, detection of the focus target can also be carried out in part by facial recognition, to determine the focus of attention of a participant's eyes, and in part by speech recognition to determine, for instance, whether detected speech is emanating from a location at the site corresponding to a participant having a focus of attention directed to a presentation focus location. When a participant is identified having a focus of attention directed at a presentation focus location and speech is detected from the participant's location, then the participant is determined to be the focus target. Different rules and techniques may be implemented to determine from video and/or audio data whether a participant should be identified as the focus target, and those skilled in the art will understand that the identification of a focus target need not be limited to the specific implementations described herein.

At 525, a determination is made of whether focus at the key participant's site should be changed from its current state, in which case the video images of the site that are delivered to other video conferencing sites are modified. "Focus" in this context includes an optical or directional focus, in which the field of view of a camera of the video conferencing system 100, 200 is mechanically or electronically adjusted to change the subject(s) captured by the camera. Thus, if there are initially three subjects (e.g., participants) in the field of view of the camera, adjusting focus can involve implementing an optical zoom function in the camera to focus on a subset of the subjects or to include a subject not currently in the field of view, or implementing a mechanical panning function to alter the field of view of the camera to exclude one or more of the subjects, and/or include one or more subjects not currently in the field of view. The zoom and panning functions may be implemented together. "Focus" also includes post-capture editing or processing of the video data to restrict the viewport (i.e., the area of the images captured) to a particular region of the original video frame or image. For instance, if the images of the video captured include all participants at the site, adjusting focus can involve cropping the video to exclude one or more of the participants. Post-capture processing and optional/directional focus techniques may be combined.

The determination of whether focus should be changed at the key participant's site is based on the current participants that are comprised in the video data delivered to the other video conference sites, and on a determination of whether the current participants include the key participant at the site and any focus target, if different than the key participant. Optionally, the determination of whether focus should be changed is also based on a determination of whether there are any participants who should be excluded from video data delivered to other sites. This determination is discussed in further detail below with reference to FIG. 8.

If it is determined at 525 that the focus should be changed, then at 530 the video images for delivery to other sites are modified, then the modified video images are distributed to the video conferencing equipment at other sites at 540. If the focus does not need to be changed, then the video images with their unmodified focus are distributed at 540.

Figure 6:
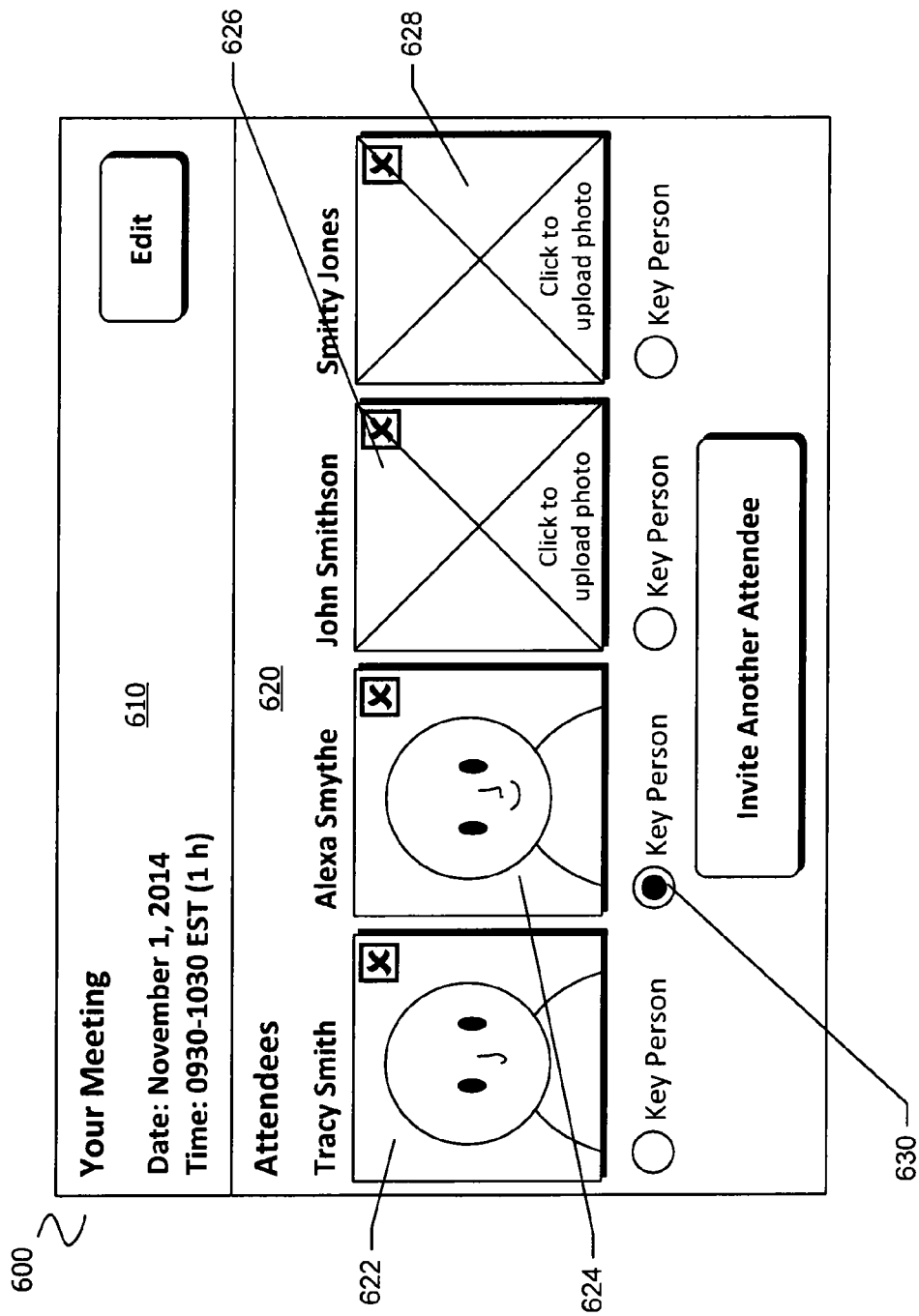
FIG. 6 is a representative illustration of a user interface for use in defining a key participant.

Turning to FIG. 6, an example user interface 600 is shown that can be used during video conference set-up to designate a key participant in a video conference. Set-up may be carried out at a video conferencing site (e.g., using the video conferencing equipment); at the host system 360; or at a computing or communication device in communication with the host system 360 and/or a video conferencing system 100, 200. For example, when a video conferencing system is used, a user—typically, the user designated as the moderator of the conference—can use a computer or communication device (e.g., personal computer, tablet, smartphone, etc.) to connect to a service operated by the host system 360 to select a time and date for the video conference, select attendees, send invitations, and upload digital files to be shared across sites, and configure other features of the video conference. Designation of the key participant can be carried out during this configuration. In the example user interface 600 of FIG. 6, visually distinguished configuration areas are provided for defining different aspects of the video conference. Configuration area 610 displays a meeting name, date, and time, and provides options for editing these attributes. Another configuration area 620 permits the user to select video conference participants ("attendees"), and select at least one key participant ("key person") of the selected participants.

In FIG. 6, images of the selected participants 622, 624, 626, and 628 are optionally displayed in configuration area 620, if the images are available. In the example user interface 600, two participants 622, 624 are illustrated with images; the remaining two participants 626, 628 are currently without images. Images may be uploaded by the user, or retrieved from a directory server or address book if available and accessible to the host system 360 or video conferencing system 100, 200. The user interface 600 also includes one or more user interface elements 630 for identifying one of the selected participants as a key participant. In this example user interface 600, the user interface elements 630 consist of a set of radio buttons permitting one participant to be selected as the key participant. Other types of user interface elements may be used.

In this particular example, identification of the key participant requires that an image of the participant be available to the system 360, 100, or 200; thus, if a participant without a corresponding image is selected as the key participant using user interface element 630, then the user can be prompted to upload or search for an image. The example key participant designation in FIG. 6 is expected to be carried out prior to commencement of the video conferencing session, as this designation is carried out when participants are selected. However, in some implementations, the user may access this user interface 600 to change the key participant or add/remove participants while the conference is in session.

Figure 7A:
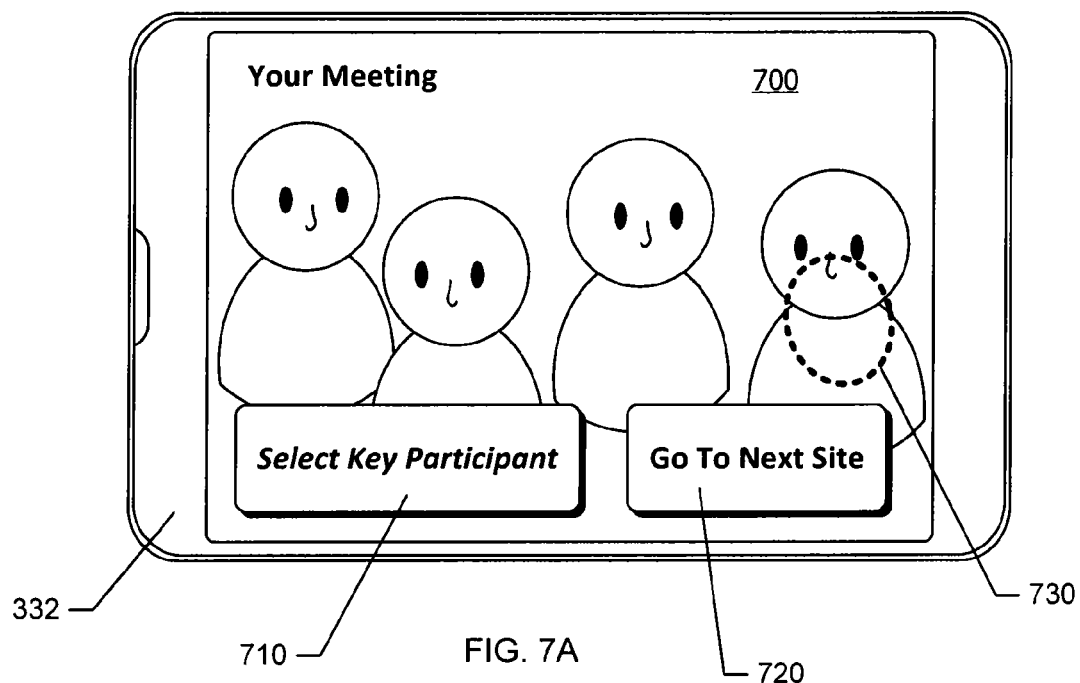
FIGS. 7A and 7B are illustrations of further user interfaces for use in defining a key participant.
Figure 7B:
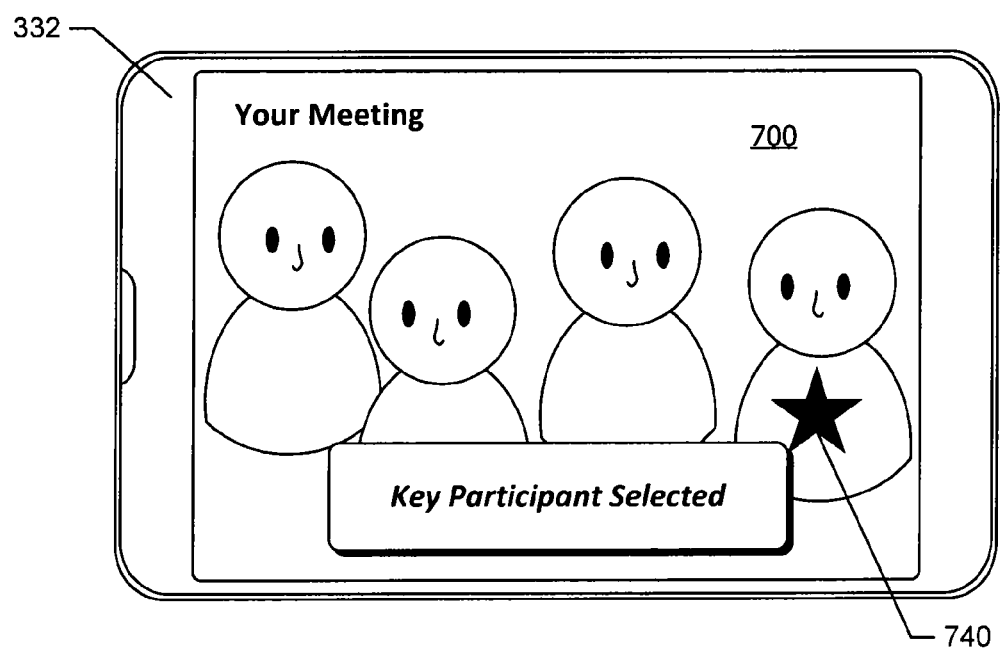

FIGS. 7A and 7B illustrate another type of user interface 700 that can be implemented on a touchscreen device, such as device 332, to designate a key participant. An image is captured of the participants, or a subset thereof, at a given site, and displayed in the user interface 700 in a mode permitting selection of a key participant (as indicated by a user interface element, dialog box 710). The image may be captured using the device 332, in which case the key participant would be selected from the participants at the same site as the device 332; alternatively, the image is captured by a video conferencing system 100, 200 at another site, and transmitted to the device 332. If there are multiple conference sites at which a key participant can be selected, the user interface 700 may also include an option for the user to obtain an image from another site (e.g., button 720). In this example, as the device 332 is a touchscreen device, an area of the screen containing the portion of the image representing the key participant can be selected by a touch event, as represented by fingertip outline 730. Once the participant is selected, an image recognition module executes to identify the facial features or other identifying features of the key participant for later identification in the video conference video feed, and optionally, as shown in FIG. 7B, a visual indicator 740 may be displayed within the user interface 700 to indicate which participant had been selected as the key participant.

The foregoing example user interface 700 can be implemented, with modification, on a device that uses a pointing device for input (e.g., a mouse or trackball) rather than a touch input device such as a touchscreen. In that case, the user may select a region of the displayed image representing the key participant by clicking and dragging to define a rectangular region of the screen.

The example of FIGS. 7A and 7B can be implemented either before the actual start of a video conference, or during the video conference session. Different methods of designating the key participant may be employed, as appropriate. It will be appreciated from the examples described above that it is not necessary that the key participant's personal identity (e.g., their name) be included in the designation; an image need only be associated with a key participant designation.

Figure 8:
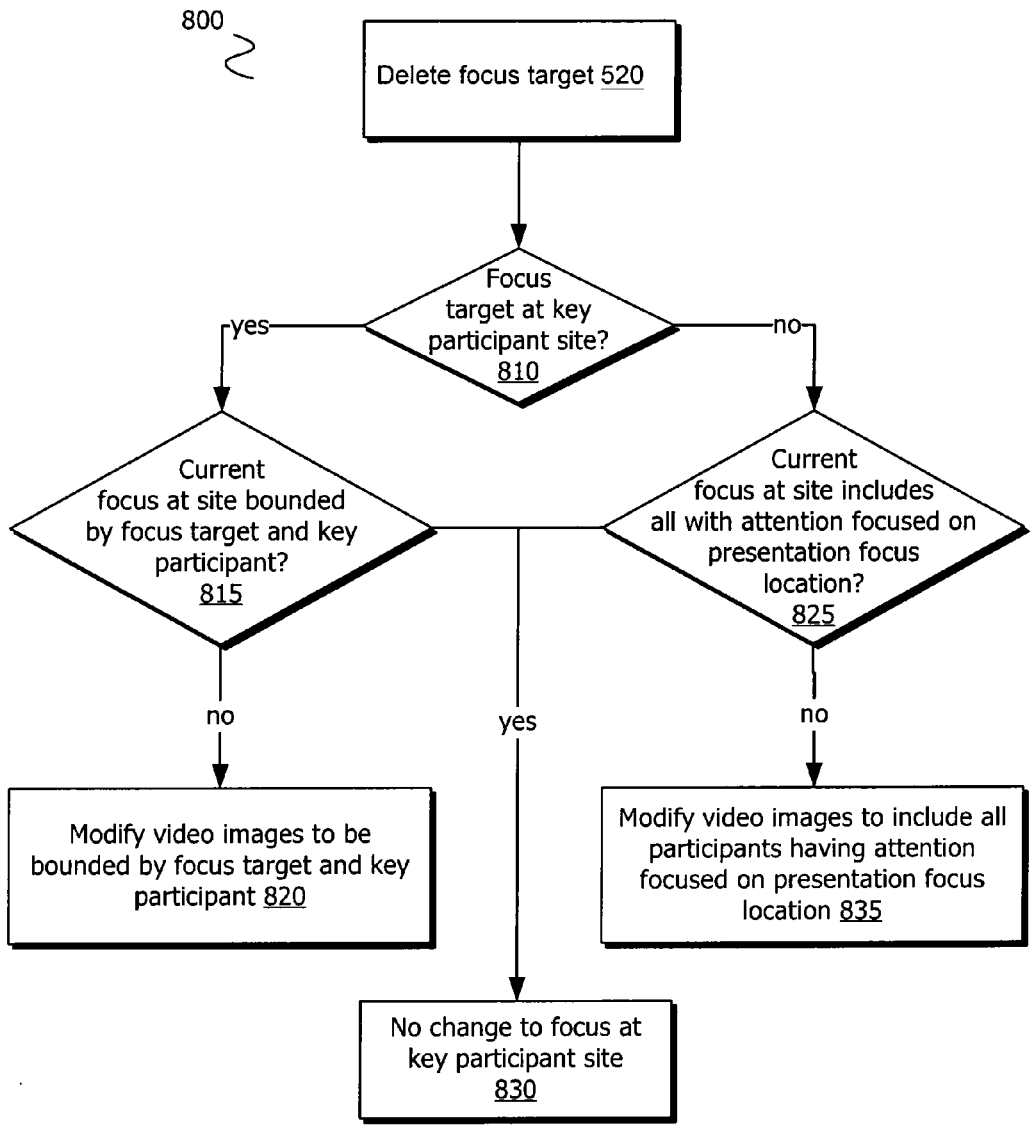
FIG. 8 is a further flowchart illustrating a method for determining when a change in focus is to be implemented.

FIG. 8 illustrates a more detailed process 800 for the determination of whether focus should be changed at the key participant's site, represented in process 500 by decision block 525. Once the focus target has been detected at 520, a determination is made at 810 of whether the focus target is located at the key participant's site. This initial determination may not be necessary where each site includes a key participant, or when the process 800 is implemented by the system 100, 200 at the key participant's site. On the other hand, this initial determination may be implemented where image recognition and associated processing is carried out at a host system 360, as the host system 360 may be processing video and audio feeds for a plurality of video conferencing sites.

In this example, participants who are determined not to have their attention focused on an appropriate presentation focus location are excluded, when possible, from focus. Thus, if the focus target is located at the key participant's site, then at 815 a further determination is made as to whether the current focus at that site (i.e., the region of the site represented in the video images delivered to other sites) is bounded by the focus target and the key participant; in other words, whether the current focus includes the focus target and the key participant and excludes any participants who are not between the focus target and the key participant. If the focus is not bounded by the focus target and the key participant, then at 820 the video images served to other sites are modified so that the focus is adjusted to be bounded by the focus target and the key participant. If it is determined at 815 that the focus is already bounded in this manner, then no change is made to the focus at the site, as indicated at 830. It should be understood that strict precision is not required by use of the term "bounded"; even when the focus is suitably bounded as described above, portions of the site environment may be included in the focus on either side of the key participant and the focus target. The site environment that is included may incorporate portions of other participants if they are in close proximity, but facial features are generally cut or cropped out of the focus.

If it is determined at 810 that the focus target is not at the key participant site, there may still be a need to adjust the focus at the key participant site. By default, when the focus target is not located at a given site, all participants at the site are included in the video images from that site unless they are not directing their attention to a suitable presentation focus location and can be removed from focus without also removing participants who are paying attention. Thus, focus may need to be adjusted at the key participant site when the focus target had previously been located at the key participant site, or when it is determined that some participants at the key participant site are no longer directing their attention to a presentation focus location. Accordingly, at 825 it is determined whether the current focus at the site includes all participants who are directing their attention (as may be determined using facial recognition on the video images obtained at the site) to a presentation focus location, and optionally, excluding those participants who are not paying attention. If so, no change is made to the focus, as indicated at 830. Otherwise, at 835 the focus is adjusted accordingly, so that the video images serving other sites are modified.

The foregoing processes will be understood more thoroughly with reference to FIGS. 9A through 17. FIGS. 9A through 15B illustrate a simple scenario involving only two video conferencing sites A and B; as will be recalled from the earlier discussion, additional sites may be involved. In this example, site A includes a first set of participants 900 consisting of participants 901, 902, and 903; participant 903 has already been designated as the key participant of the conference. Site B includes a second set of participants 950 consisting of participants 951 and 952. The moderator of the conference may be any one of the participants in sets 900, 950.

In this suite of drawings, at each site A, B, the video conferencing system and its focus is notionally represented by camera 910, 960 respectively, and the "focus" of the camera 910, 960 is represented by viewing angle 915, 965 respectively. As explained above, the "focus" need not be an optical focus, and should not be read to be limited as such unless expressly stated. This "focus" may be determined programmatically and implemented by post-capture data processing of the video data so as to include or exclude certain participants, and may be implemented at a host system 360 rather than by a local video conferencing system 100, 200. Screens 920, 970 represent the video images, modified as appropriate by a change in focus, that are received by each site A, B from the other site B, A.

Figure 9A:
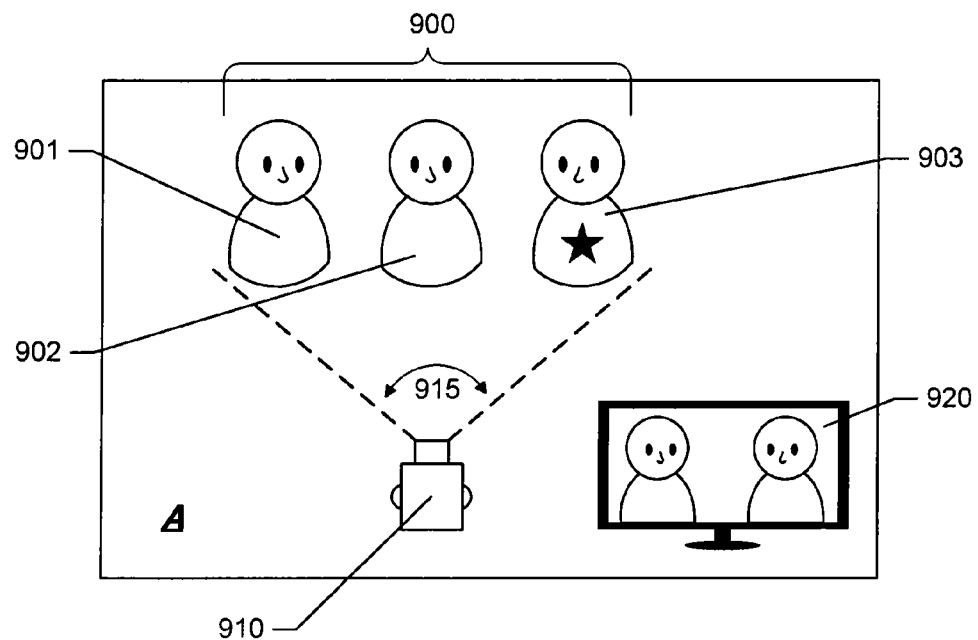
FIGS. 9A to 15B are schematic diagrams illustrating dynamic focus adjustment during a video conference.
Figure 9B:
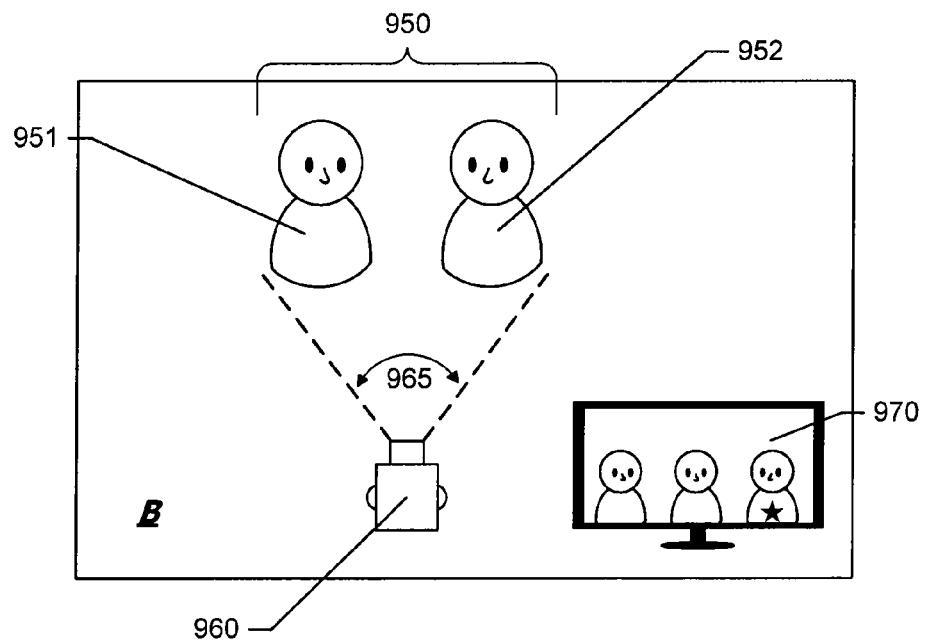

FIGS. 9A-9B represent a possible initial state of the conference, where no participant in either set 900, 950 is engaged in presentation, and all are directing their attention to a presentation focus location (e.g., camera 910, 960 respectively). By default, when no participant at a site is speaking, all participants are to be included in their respective foci, as depicted by the viewing angles 915, 965 and screens 970, 920.

Figure 10A:
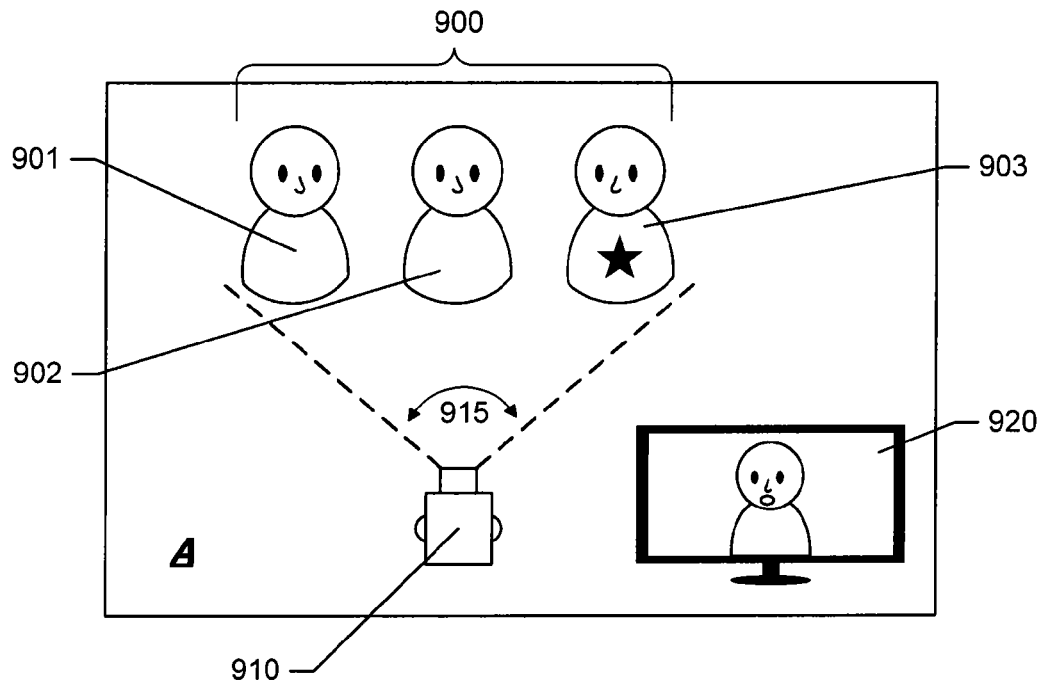
Figure 10B:
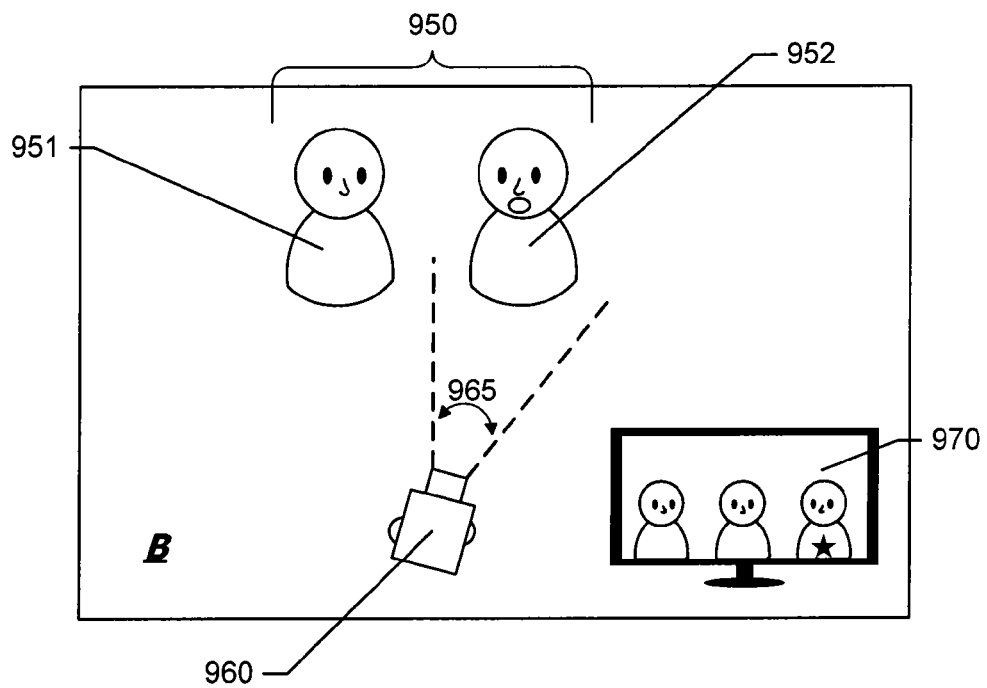

Next, in FIG. 10B, participant 952 at site B starts speaking. In accordance with the discussion above, the video images from site B are processed and it is determined that participant 952 is the current focus target of the video conference. In this example, focus at site B is dynamically adjusted during the conference to include the focus target and exclude others except for the key participant, as shown by viewing angle 965. Since the key participant is not present at site B, there is a negative determination at decision block 810 of FIG. 8. Furthermore, since all participants that are determined to be paying attention at site A, are currently in focus, the determination at decision block 825 is positive; accordingly, no change is made to the focus at the key participant site A, as indicated at 830 as can be seen in screen 970.

Figure 11A:
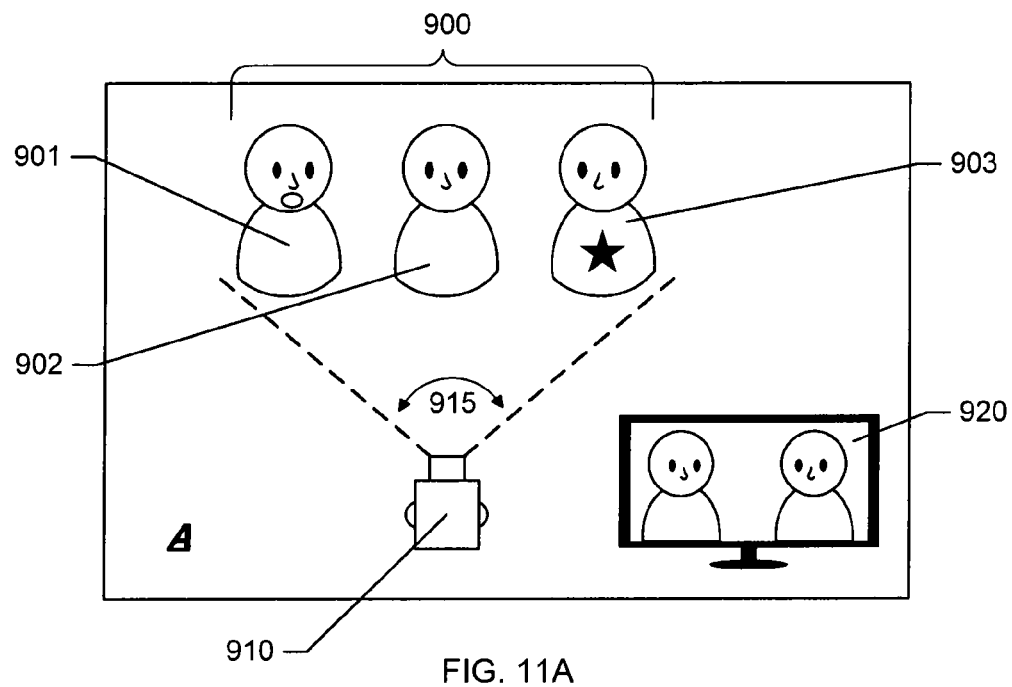
Figure 11B:
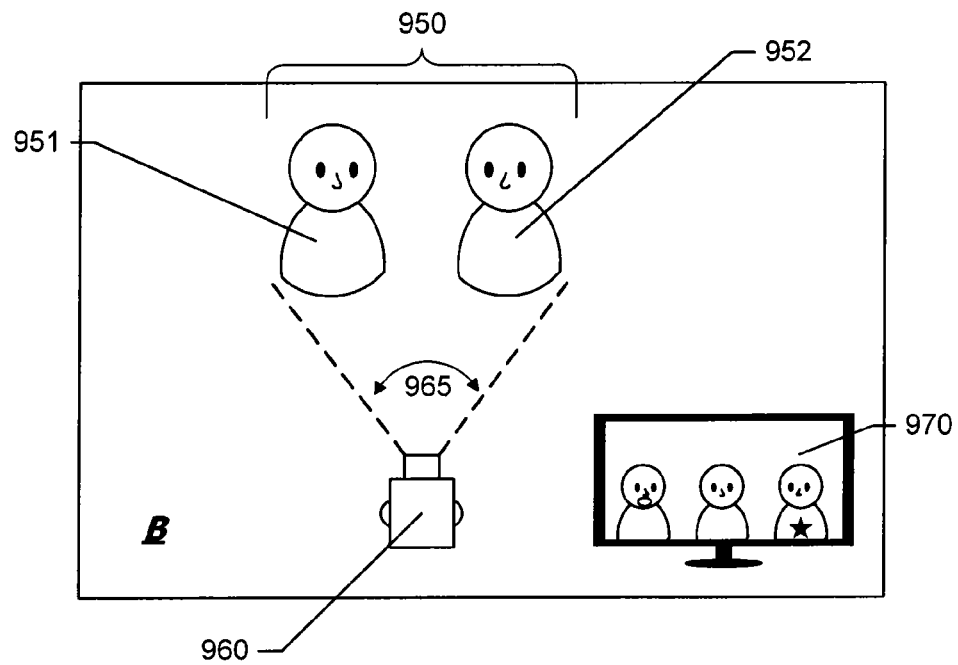

Subsequently, as shown in FIG. 11B, participant 952 ceases speaking, and participant 901 (FIG. 11A) at site A begins speaking. Thus, a new focus target is identified as participant 901. Since no participant at site B is presenting and both are paying attention, the focus at site B returns to the original state including all participants, as indicated by viewing angle 965. Turning to site A and process 800 in FIG. 8, the focus target 901 is now at the key participant site, as determined at block 810. It is then determined at 815 using image recognition techniques whether the current focus is bounded by the focus target and the key participant. The focus target 901 and key participant 903 are separated by participant 902. However, the current focus is already bounded by the focus target 901 and the key participant 903; therefore, no change to the focus is necessary, as indicated at 830.

Figure 12A:
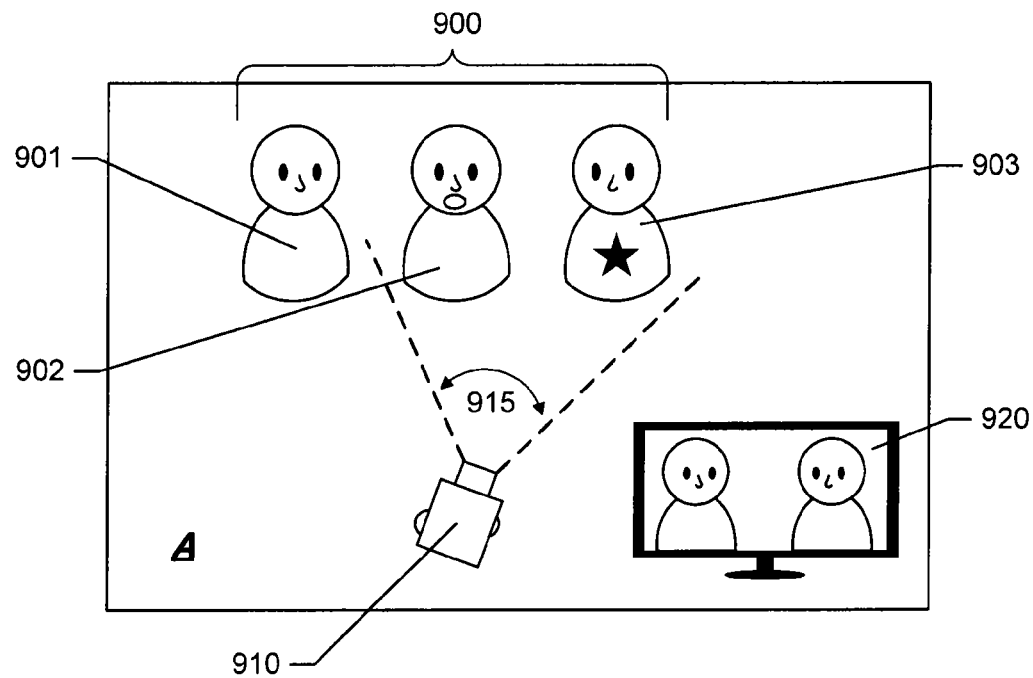
Figure 12B:
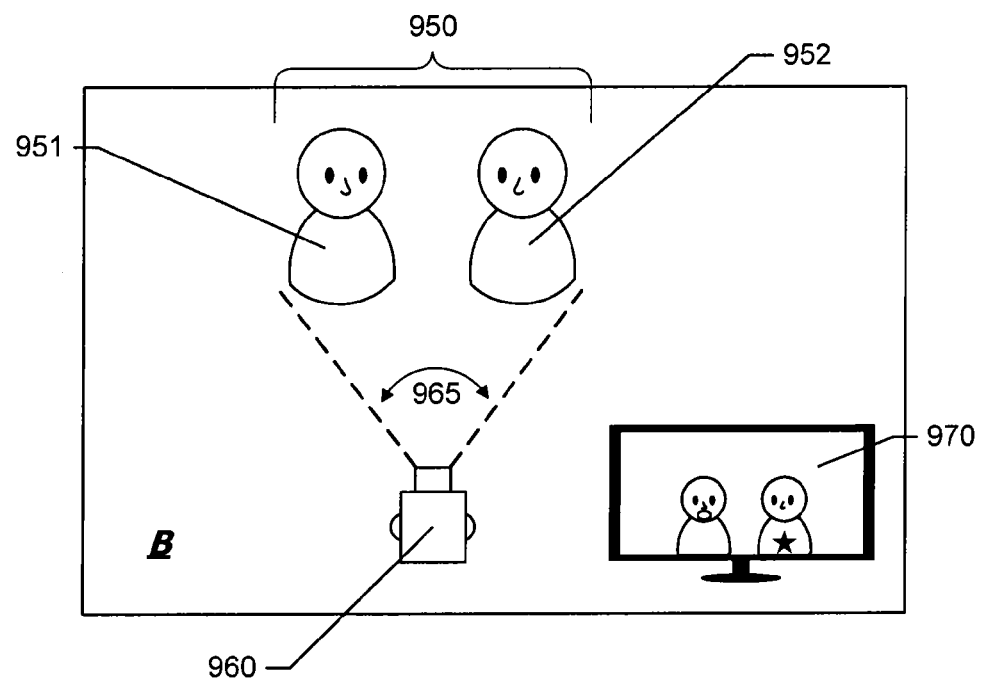

Next, in FIG. 12A, participant 901 has ceased speaking, and now participant 902 asks a question, with her attention directed to the camera. Participant 902 is therefore identified as the focus target. Returning to process 800, at 810 it is determined that the focus target, 902, is located at the key participant site. Therefore, at 815, a determination is made of whether the current focus is bounded by the focus target and the key participant. In this case, the current focus includes all three participants in set 900, but is not bounded by the key participant 903 and the focus target 902. Therefore, at 820 the focus is adjusted and the video images accordingly modified so that the focus is bounded by the focus target 902 and the key participant 903, as indicated by viewing angle 915 and screen 970 (FIG. 12B).

Figure 13A:
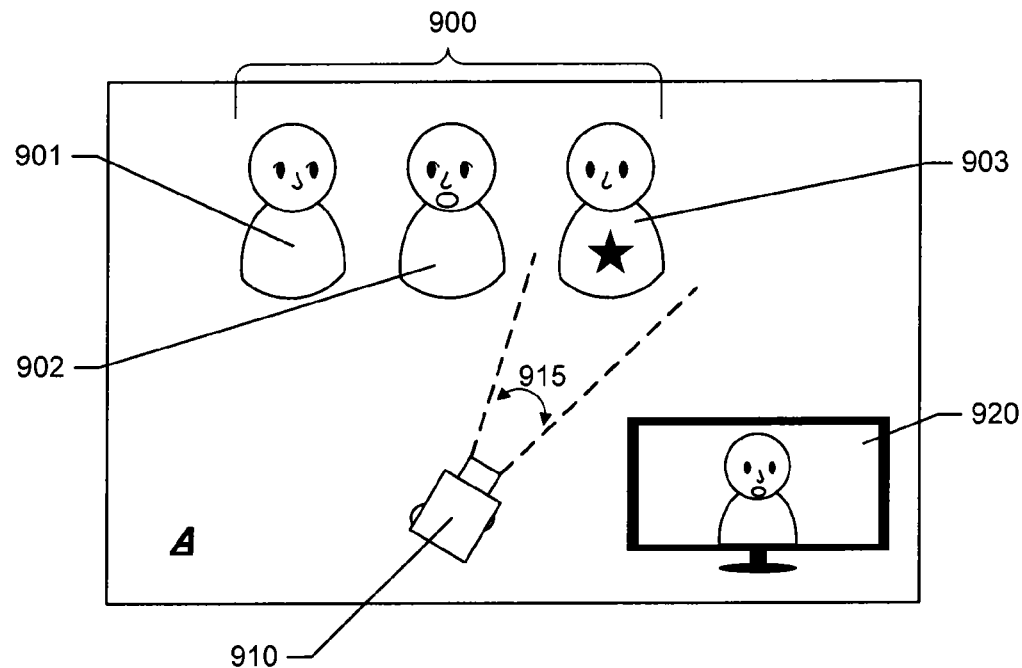
Figure 13B:
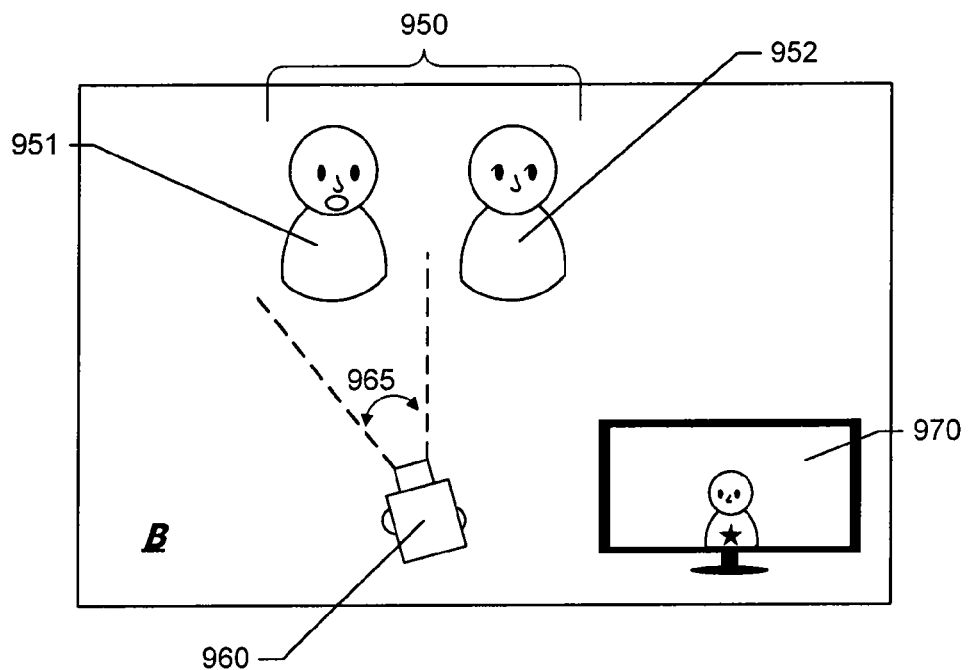

In FIGS. 13A-13B, participant 902 at site A continues to speak; however, she is now speaking to participant 901, so her attention is no longer directed to the camera or another designated presentation focus location. Facial recognition techniques applied to the video data obtained at site A indicate that neither participant 901 nor 902 is paying attention. Moreover, the focus target is now identified as participant 951 at site B, who is speaking to the camera 960. Participant 952 may or may not be paying attention. Thus, the focus is adjusted at both sites A and B. At site B, the focus is adjusted as indicated by angle 965 to include participant 951, the focus target, and exclude participant 952, who is not the focus target. At site A, the participants 901, 902, who are not paying attention, are excluded from the adjusted focus, leaving participant 903, as indicated by angle 915. Note that because focus is always maintained on the key participant of the conference, even if participant 903 were no longer paying attention, she would remain within focus at site A. Also note that if participant 901 were directing his attention to a presentation focus location but participant 902 was not, the focus at site A would include both participants 901 and 903; thus, 902 would not be excluded from the focus due to her position between the others.

Figure 14A:
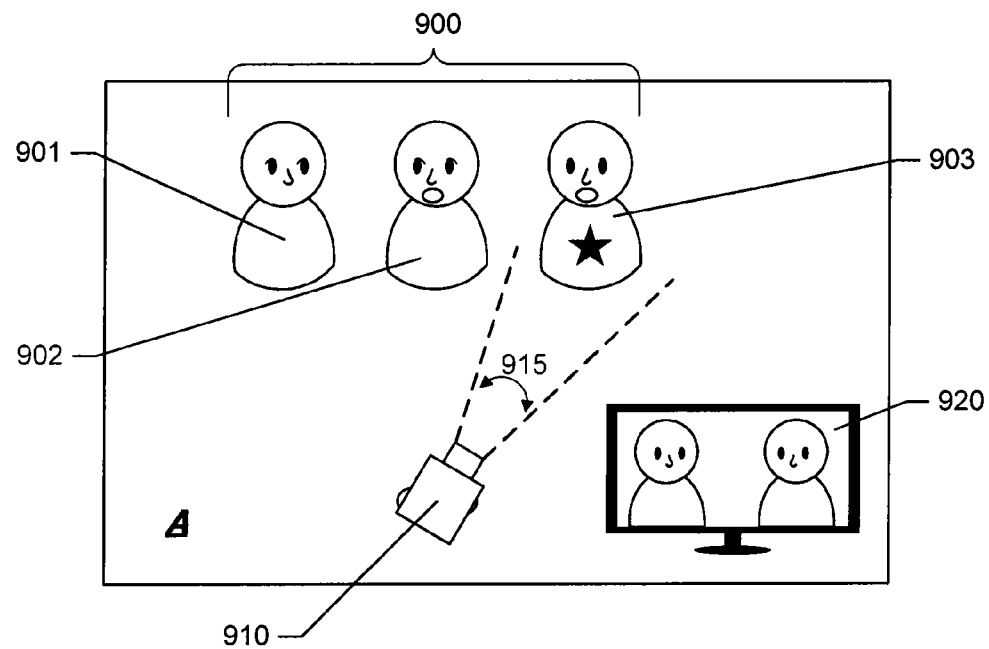
Figure 14B:
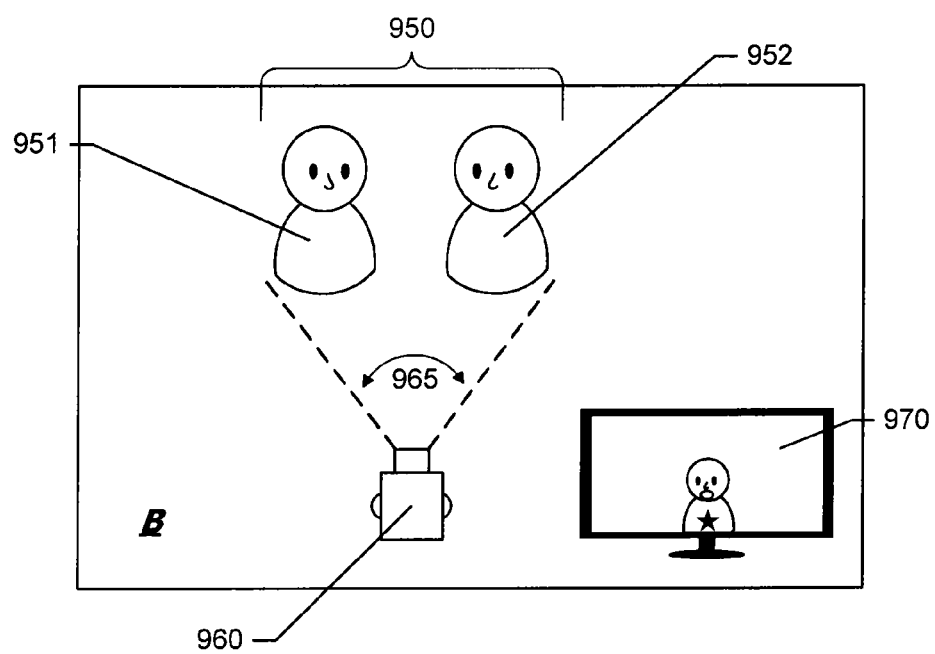

Next, in FIGS. 14A-14B, the key participant 903 begins to speak to the other participants at site B, and the site B participants cease speaking and pay attention. Accordingly, the focus at site B is adjusted as indicated by angle 965 to include both users 951 and 952. Site A now includes the focus target as well as the key participant, who are currently the same participant 903. Thus, applying the process 800, at 810 it is determined that the focus target, participant 903, is located at the key participant site A. At 815 it is then determined whether the current focus (which was defined in FIGS. 13A-13B) is bounded by both the focus target and the key participant. In this example, this is the case, since the focus target and the key participant are the same participant 903, and previously the focus included only participant 903. Therefore, not change is made to the focus at the key participant site, as indicated at 830.

Figure 15A:
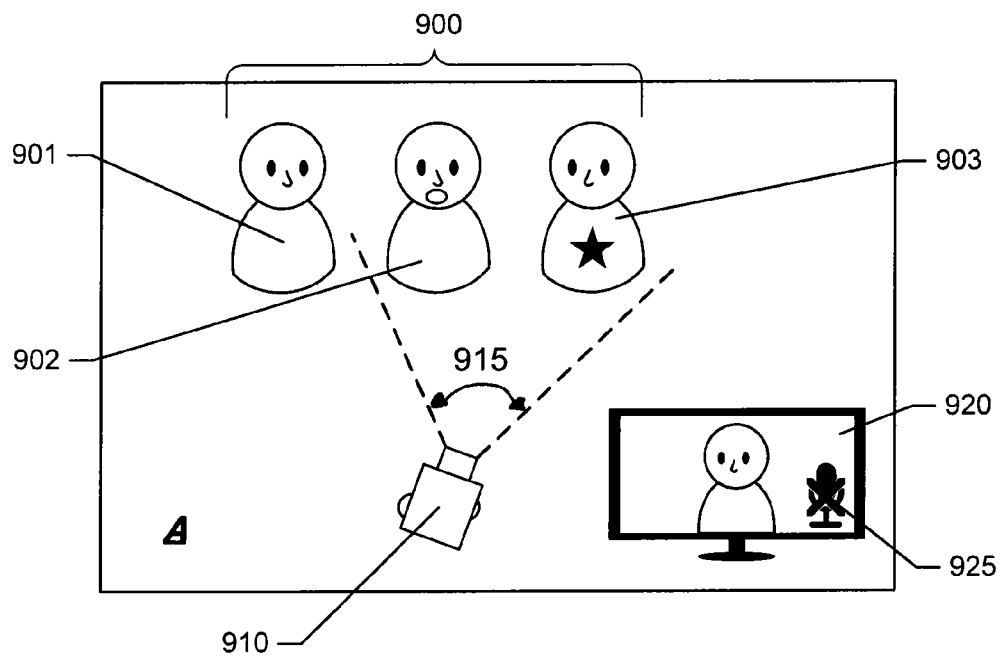
Figure 15B:
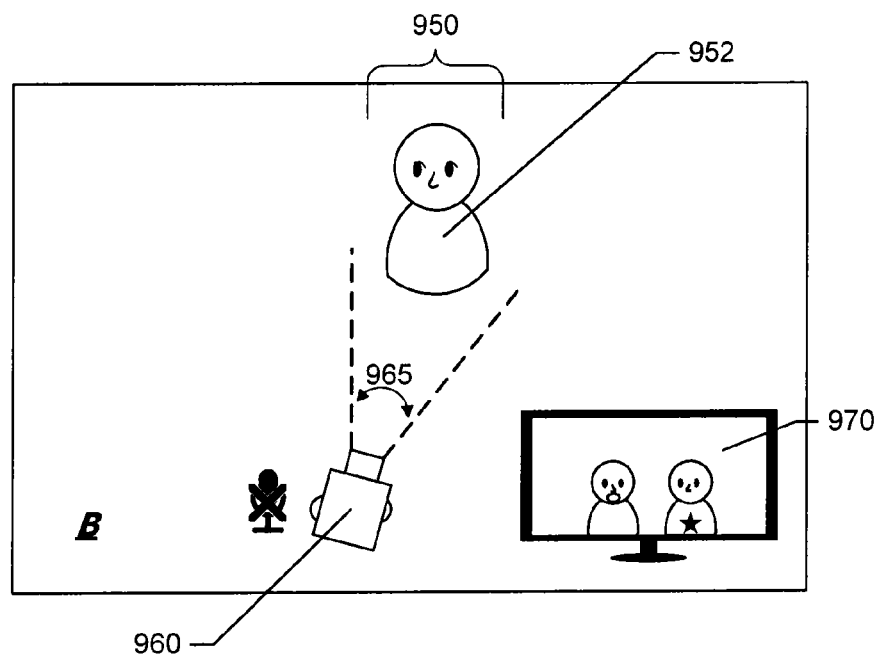

Finally, in FIGS. 15A-15B, one of the participants 951 at site B has left, leaving only participant 952. In this example, participant 952 is no longer paying attention, for example because her phone rang and she is taking the call; facial recognition is used to determine that the participant's gaze is directed away from the camera or another presentation focus location. By default in this example, the remaining single participant 952 is always included in the focus, as indicated by angle 965. However, the audio from site B is automatically muted because it is presumed that any speech from participant 952 while she is not directing her attention to the conference is not intended for other participants. The muted status may be indicated to other participants by a mute icon 925 on the site A display screen 920.

Further, key participant 903 has ceased speaking, and participant 902 has begun to speak again. Thus, a new focus target, participant 902, is identified. Returning to FIG. 8, it is determined at 810 that the focus target is at the key participant site A. However, as determined at 815, the current focus at the site (which included only the key participant 903) is no longer bounded by the focus target, participant 902, and the key participant 903. Accordingly, at 820, the focus is adjusted appropriately. As indicated by angle 915 in FIG. 15A, the focus now includes both participants 902 and 903.

Figure 16:
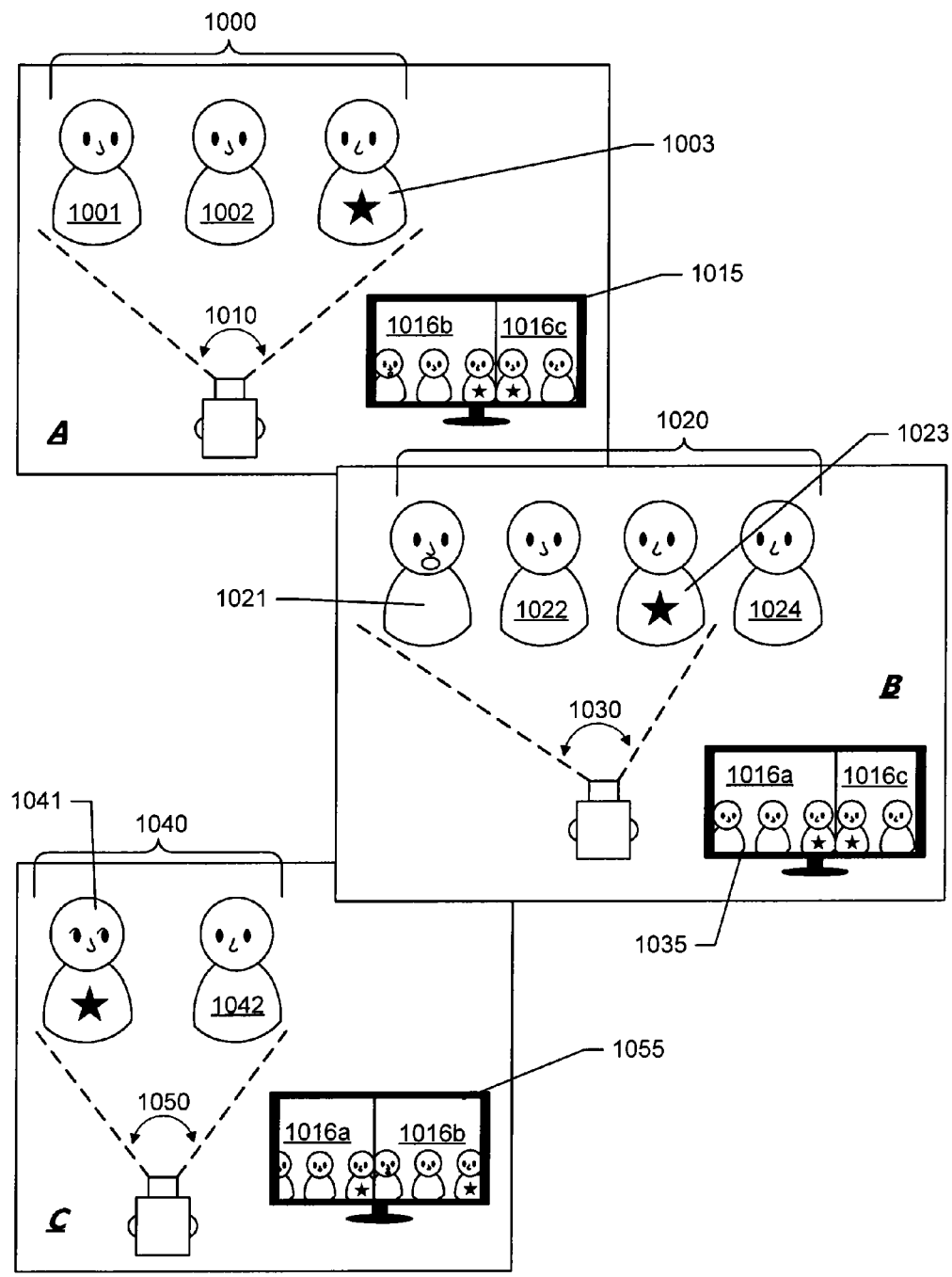
FIG. 16 is a schematic diagram illustrating dynamic focus adjustment during a video conference having multiple key participants.

FIGS. 9A through 15B illustrated a scenario in which a single key participant is designed for all sites of the video conference. In some implementations, multiple key participants may be designated; for example, up to one key participant at each site. FIG. 16 illustrates a scenario having three conference sites A, B, and C, with multiple participants and a key participant at each site. At site A, a first set of participants 1000 includes participants 1001, 1002, and 1003; participant 1003 is designated as a key participant. At site B, a set of participants 1020 includes participants 1021, 1022, 1023, and 1024; participant 1023 is designated as a key participant. At site C, the set of participants 1040 has participants 1041 and 1042, and participant 1041 is designated as a key participant. A key participant need not be identified at every site.

FIG. 16 illustrates the focus at each site A, B, C at a given point in time where participant 1021 at site B is speaking and is therefore the focus target, and all participants at other sites, save key participant 1041 at site C, are directing their attention to their respective cameras. Thus, as indicated by angle 1010 at site A, focus at site A includes the entire set of participants 1000. At site B, angle 1030 illustrates that focus is bounded by the key participant 1023 at one end, and speaking participant 1021 at the other; participant 1022 is included in the focus by virtue of his position between participants 1021 and 1023, but participant 1024 is excluded because the focus is trained on the focus target 1021 and the key participant 1023. At site C, angle 1050 indicates that the focus includes both participants 1041 and 1042, even though participant 1041 is not directing his attention to a presentation focus location such as the camera at his site. However, participant 1041 is also the key participant at that site; therefore focus includes him.

As suggested by screens 1015, 1035, and 1055, the video feeds of the other sites received at a given site are presented in a split-screen format. Thus at site A, video feeds 1016b and 1016c are displayed onscreen; at site B, feeds 1016a and 1016c are displayed; and at site C, feeds 1016a and 1016b are displayed. It can be seen in this example that by restricting the focus at site B to be bounded by the focus target 1021 and the key participant 1023, it is not necessary to deliver video content included participant 1024 to sites A and C, thus reducing the amount of screen area required to fit the video images received from site B, or avoiding the need to reduce those video images in size so as to fit them onscreen.

In addition, from the above examples, it can be appreciated that by retaining the key participant within focus for a given video conference site, the real or perceived quality of the streamed video data and/or the video conferencing experience of the participants at other sites is potentially improved. Contextual information relating to the key participant is maintained within the video and/or audio feed. Moreover, because the key participant is included in the focus, the amount of switching between individual faces or participants is potentially reduced in particular circumstances, depending on the identity of the presenters or participants focusing their attention on the conference. A reduction in the number of drastic scene changes within a video stream can result in improved transmission efficiency and reduced pixilation depending on the compression technology applied to the video data, for example when using MPEG-2 or H.264.

In this description, emphasis was given to the receipt and processing of video feeds; however, these concepts also apply to audio feeds, with appropriate adaptation. Moreover, while the examples below are generally directed to scenarios where the focus target is a speaking individual, it will be appreciated by those skilled in the art that the focus target need not be determined exclusively by detecting speech by a participant. A participant who is determined to be the focus target may be determined as such because he or she is engaged in presentation with his or her attention directed to a presentation focus location, for instance by manipulating an exhibit at the video conference site (e.g., writing on a whiteboard or otherwise interacting with a display panel), or by using different means of expression (e.g., sign language).

Figure 17A:
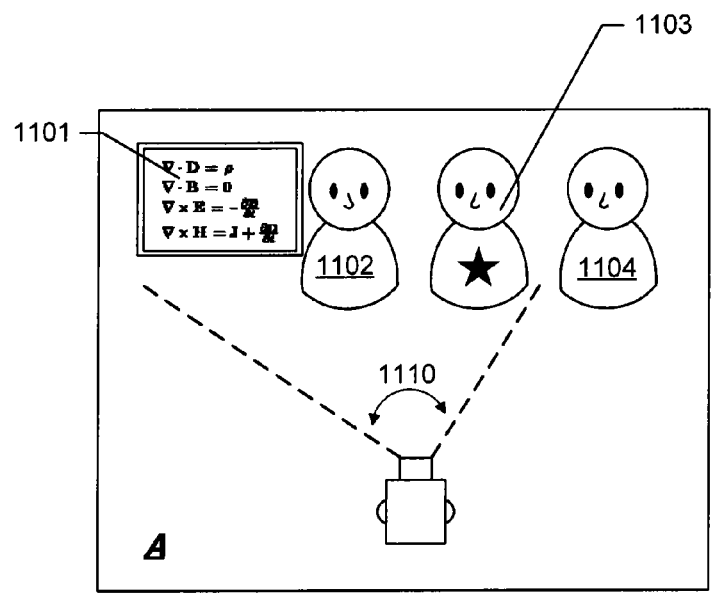
FIGS. 17A and 17B are a schematic diagrams illustrating dynamic focus adjustment in dependence on a first key participant and second a presentation focus location, such as a second key participant.
Figure 17B:
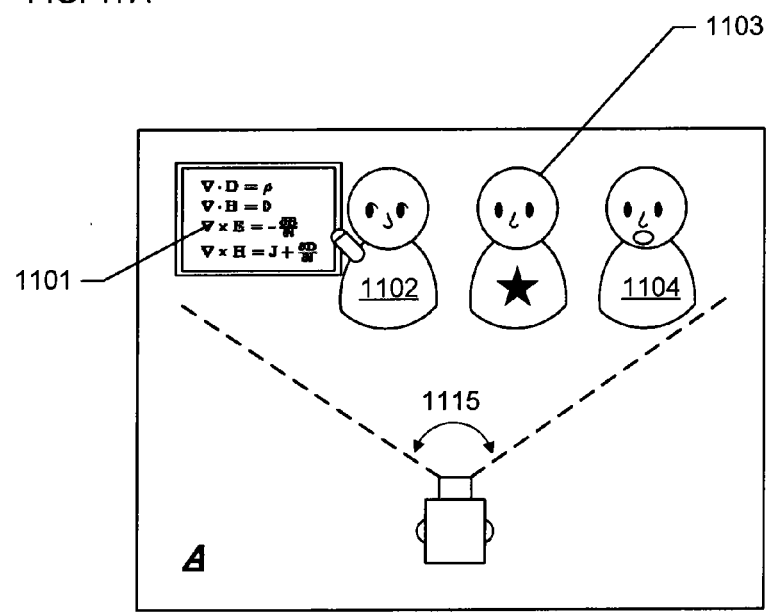

An example is illustrated in FIGS. 17A and 17B. In the example of FIG. 17A, a whiteboard 1101 is displayed at video conference site A, and is included in viewing angle 1110. The whiteboard 1101 is adjacent participant 1102 of a set of participants also including participants 1103 and 1104. Participant 1103 is designated as a key participant.

In this example, it may be desirable to keep the whiteboard in view. In one implementation, this is done by designating the whiteboard as a "key participant" in a manner similar to the designation applied to the participant 1103. Applying the processes described above, the whiteboard, like key participant 1103, would thereafter be kept within the focus at the site. Referring to FIGS. 7A and 7B again, for example, this designation applied to the whiteboard or another stationary (or non-human) target can be done by selecting the image representation of the whiteboard. Thus, in such an implementation, multiple key "participants" are identified, but one (or more) of these "participants" are not in fact speaking participants. In other implementations, other identification means may be used to identify the whiteboard or other target as an exhibit of interest. Pattern recognition, for example, may be used to match an image of the whiteboard to a library of typical conference exhibits that are to be kept in focus.

Moreover, key participants or specially recognized exhibits may also be identified as presentation focus locations, where a participant may direct their individual attention without being excluded from focus on that basis. Recall that in the example of FIG. 13A, participants 901 and 902 were excluded from focus because facial recognition applied to the video images at site A would have determined that the focus of their attention was not directed to the camera. In other implementations, however, recognizing the relative importance of the key participant(s), a determination that a non-key participant was directing his or her attention towards a key participant and/or a current speaker (i.e., focus target) and not towards the camera or display of the local video conferencing system 100, 200 would not constitute a determination that the non-key participant should be excluded from focus. In other words, the key participant and/or the focus target is also designated as a presentation focus location; i.e., an appropriate place for participants to direct their attention during a conference. Thus, as shown in FIG. 17B, even though participant 1102 is directing his attention to the whiteboard 1101, he is still included in the focus as indicated by angle 1115, as is participant 1104, who is currently speaking. In short, the presentation focus locations in this example include the video conferencing system camera and/or display screen; the key participant(s) at the site; any specially identified exhibits; and the focus target, if different than the key participant(s).

The embodiments and examples described herein accordingly provide a method, system, and machine-readable medium presenting improvements in dynamic focus adjustment during a video conference. In one embodiment, there is provided a method of providing dynamic focus on one or more participants during a video conference at a plurality of sites, the method being implemented by a system comprising at least one electronic device, the method comprising: receiving a designation of a key participant of the video conference; identifying the key participant at a first site of the plurality of sites of the video conference, the first site comprising a plurality of participants including at least a first participant and a key participant; obtaining video images for the first site, the video images comprising at least the key participant; determining that the first participant is a focus target of the video conference; and modifying the video images for the first site to comprise both the first participant and the key participant while the first participant is the focus target.

In one aspect, the plurality of participants of the first site comprises a second participant other than the first participant or key participant, and the video images as modified exclude the second participant when the first participant and the key participant are determined to be immediately adjacent each other, and include the second participant when the second participant is determined to be positioned between the first participant and the key participant.

In a further aspect, the method further comprises determining that the second participant is the focus target of the video conference; and further modifying the video images to comprise both the second participant and the key participant while the second participant is the focus target.

In another aspect, the method further comprises determining that a participant at a further site of the plurality of sites, the further site being remote from the first site, is the focus target of the video conference; and modifying the video images for the first site to include all of the plurality of participants.

In still a further aspect, the video images are transmitted to at least one further site of the plurality of sites.

In another aspect of the method, the method is implemented by a host server remote from any of the plurality of sites, the host server receiving video images obtained by at least one camera located at the first site over a network. The host server may alternatively be located at one of the video conferencing sites, or host server functions may be provided by the video conferencing equipment at one site.

In still a further aspect, the obtaining video images for the first site, the video images comprising at least the key participant, comprises obtaining video images including all participants of the plurality of participants at the first site; and modifying the video images for the first site comprises cropping the obtained video images to exclude at least one of the participants of the plurality of participants at the first site.

In yet another aspect, the identifying the key participant comprises applying image recognition to match a region of an initial video image obtained for the first site with a received image of the key participant; or the identifying the key participant comprises receiving an indication that a region of an initial video image obtained for the first site comprises a representation of the key participant.

In another aspect, the determining that the first participant is a focus target comprises determining that: the first participant is engaged in presentation; and a visual focus of attention of the first participant is directed to a presentation focus location. The presentation focus location may be at least one of a display screen presenting video images obtained from another site of the plurality of sites; a camera located at the first site; the key participant; and a designated region.

The foregoing method and variations may be implemented by a video conferencing system or a host system in communication with video conferencing systems in a video conferencing session. An appropriate system for implementing the method can include at least one communication subsystem, and at least one processor in communication with the at least one communication subsystem, the at least one processor being configured to implement the method and variations described herein. An appropriate system may, for example, be implemented on a personal communication device or a server as well as on dedicated video conferencing communication equipment.

There is also provided an electronic device-readable medium, which may be non-transitory and/or physical, bearing code which, when executed by one or more processors of a system in communication with at least one camera device located at a first site of a plurality of sites of a video conference, causes the system to implement the method and variations described herein.

The examples and embodiments are presented only by way of example and are not meant to limit the scope of the subject matter described herein. Variations of these examples and embodiments will be apparent to those in the art, and are considered to be within the scope of the subject matter described herein. Some steps or acts in a process or method may be reordered or omitted, and features and aspects described in respect of one embodiment may be incorporated into other described embodiments, while still achieving the desired outcome.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

Throughout the specification, terms such as "may" and "can" are used interchangeably. Use of any particular term should not be construed as limiting the scope or requiring experimentation to implement the claimed subject matter or embodiments described herein. Any suggestion of substitutability of the various types of equipment described herein for other implementation means should not be construed as an admission that aspects of the invention described herein are abstract, or that the physical equipment or its components are non-essential to aspects of the invention described herein. Further, while this disclosure may have articulated specific technical problems that are addressed by aspects of the invention, the disclosure is not intended to be limiting in this regard; the person of ordinary skill in the art will readily recognize other technical problems addressed by aspects of the invention.

A portion of the disclosure of this patent document may contain material which is or may be subject to one or more of copyright, design, or trade dress protection, whether registered or unregistered. The rightsholder has no objection to the reproduction of any such material as portrayed herein through facsimile reproduction of this disclosure as it appears in the Patent and Trademark Office records, but otherwise reserves all rights whatsoever.

What is claimed is:

1. A method of providing dynamic focus on one or more participating users during a video conference at a plurality of sites, the method comprising:
   receiving a designation of a key participating user participating in the video conference;
   identifying the key participating user at a first site of the plurality of sites of the video conference, the first site comprising a plurality of participating users participating in the video conference, including at least a first participating user and the key participating user;
   obtaining video images for the first site, the video images comprising at least the key participating user;
   determining that the first participating user is a focus target of the video conference;
   determining position of the key participating user relative to the first participating user and any other participating users of the plurality of participating users; and
   automatically modifying the video images for the first site to comprise both the first participating user and the key participating user based on the first participating user being the focus target and based further on the determined position of the key participating user, wherein the focus target is other than the key participating user and the modifying maintains the key participating user in the modified video images despite the key participating user being different from the focus target, wherein the plurality of participating users of the first site comprises a second participating user other than the first participating user or the key participating user, and further wherein the modifying modifies the video images to exclude the second participating user based on determining that the first participating user and the key participating user are immediately adjacent each other.

2. The method of claim 1, further comprising:
   determining that the second participating user becomes the focus target of the video conference; and
   further modifying the video images to comprise both the second participating user and the key participating user, and to exclude the first participating user, based on the second participating user being the focus target.

3. The method of claim 1, further comprising:
   determining that a participating user at a further site of the plurality of sites is the focus target of the video conference, the further site being remote from the first site; and
   modifying the video images for the first site to include the plurality of participating users.

4. The method of claim 1, further comprising transmitting the video images to at least one further site of the plurality of sites.

5. The method of claim 1, wherein the identifying the key participating user comprises applying image recognition to match a region of an initial video image obtained for the first site with a received image of the key participating user.

6. The method of claim 1, wherein the identifying the key participating user comprises receiving an indication that a region of an initial video image obtained for the first site comprises a representation of the key participating user.

7. The method of claim 1, wherein the determining that the first participating user is the focus target comprises determining that:
   the first participating user is engaged in presentation; and
   a visual focus of attention of the first participating user is directed to a presentation focus location.

8. The method of claim 7, wherein the presentation focus location comprises at least one selected from the group consisting of: a display screen presenting video images obtained from another site of the plurality of sites, a camera located at the first site, the key participating user, and a designated region.

9. The method of claim 1, wherein the automatically modifying the video images for the first site comprises at least one of the group consisting of: (i) adjusting a zoom or pan function of a video camera that obtains the video images for the first site or (ii) performing post-capture editing of the video images obtained from the video camera.

10. A computer system for providing dynamic focus on one or more participating users during a video conference at a plurality of sites, the computer system comprising:
   a memory; and
   a processing device in communication with the memory, wherein the computer system is configured to perform a method, said method comprising:
      receiving a designation of a key participating user participating in the video conference;
      identifying the key participating user at a first site of the plurality of sites of the video conference, the first site comprising a plurality of participating users participating in the video conference, including at least a first participating user and the key participating user;
      obtaining video images for the first site, the video images comprising at least the key participating user;
      determining that the first participating user is a focus target of the video conference;

determining position of the key participating user relative to the first participating user and any other participating users of the plurality of participating users; and automatically modifying the video images for the first site to comprise both the first participating user and the key participating user based on the first participating user being the focus target and based further on the determined position of the key participating user, wherein the focus target is other than the key participating user and the modifying maintains the key participating user in the modified video images despite the key participating user being different from the focus target, wherein the plurality of participating users of the first site comprises a second participating user other than the first participating user or the key participating user, and further wherein the modifying modifies the video images to exclude the second participating user based on determining that the first participating user and the key participating user are immediately adjacent each other.

11. The computer system of claim 10, wherein the method further comprises:

determining that the second participating user becomes the focus target of the video conference; and further modifying the video images to comprise both the second participating user and the key participating user, and to exclude the first participating user, based on the second participating user being the focus target.

12. The computer system of claim 10, wherein the method further comprises:

determining that a participating user at a further site of the plurality of sites is the focus target of the video conference, the further site being remote from the first site; and modifying the video images for the first site to include the plurality of participating users.

13. The computer system of claim 10, wherein the determining that the first participating user is the focus target comprises determining that:

the first participating user is engaged in presentation; and a visual focus of attention of the first participating user is directed to a presentation focus location.

14. The computer system of claim 13, wherein the presentation focus location comprises at least one selected from the group consisting of: a display screen presenting video images obtained from another site of the plurality of sites, a camera located at the first site, the key participating user, and a designated region.

15. The computer system of claim 10, wherein the identifying the key participating user comprises receiving an indication that a region of an initial video image obtained for the first site comprises a representation of the key participating user.

16. The computer system of claim 10, wherein the automatically modifying the video images for the first site comprises at least one of the group consisting of: (i) adjusting a zoom or pan function of a video camera that obtains the video images for the first site or (ii) performing post-capture editing of the video images obtained from the video camera.

17. A method of providing dynamic focus on one or more participating users during a video conference at a plurality of sites, the method comprising:

receiving a designation of a key participating user participating in the video conference;

identifying the key participating user at a first site of the plurality of sites of the video conference, the first site comprising a plurality of participating users participating in the video conference, including at least a first participating user and the key participating user;

obtaining video images for the first site, the video images comprising at least the key participating user, wherein the obtaining video images for the first site comprises obtaining video images of the plurality of participating users at the first site;

determining that the first participating user is a focus target of the video conference;

determining position of the key participating user relative to the first participating user and any other participating users of the plurality of participating users; and automatically modifying the video images for the first site to comprise both the first participating user and the key participating user based on the first participating user being the focus target and based further on the determined position of the key participating user, wherein the modifying the video images for the first site comprises cropping the obtained video images to exclude at least one of the participating users of the plurality of participating users at the first site, wherein the focus target is different from the key participating user and the modifying maintains the key participating user in the modified video images despite the key participating user being different from the focus target, wherein the plurality of participating users of the first site comprises a second participating user other than the first participating user or the key participating user, and further wherein the modifying modifies the video images to exclude the second participating user based on determining that the first participating user and the key participating user are immediately adjacent each other.

18. The method of claim 17, further comprising:

determining that the second participating user becomes the focus target of the video conference; and further modifying the video images to comprise both the second participating user and the key participating user, and to exclude the first participating user, based on the second participating user being the focus target.

19. The method of claim 17, further comprising:

determining that a participating user at a further site of the plurality of sites is the focus target of the video conference, the further site being remote from the first site; and modifying the video images for the first site to include the plurality of participating users.

20. The method of claim 17, wherein the automatically modifying the video images for the first site comprises at least one of the group consisting of: (i) adjusting a zoom or pan function of a video camera that obtains the video images for the first site or (ii) performing post-capture editing of the video images obtained from the video camera.

* * * * *